US012034200B1

(12) United States Patent
Azad et al.

(10) Patent No.: US 12,034,200 B1
(45) Date of Patent: Jul. 9, 2024

(54) INTEGRATED CAMERA ANTENNA

(71) Applicant: META PLATFORMS TECHNOLOGIES, LLC, Menlo Park, CA (US)

(72) Inventors: Umar Azad, San Jose, CA (US); Peter Eli Renner, San Jose, CA (US); Geng Ye, Union City, CA (US); Bruno Cendon Martin, Palo Alto, CA (US); Yizhi Xiong, Foster City, CA (US); Honghong Peng, Mountain View, CA (US); Timothy Lee Droz, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 171 days.

(21) Appl. No.: 17/725,519

(22) Filed: Apr. 20, 2022

(51) Int. Cl.
*H01Q 1/22* (2006.01)
*G02B 27/01* (2006.01)
*H01Q 1/27* (2006.01)
*H01Q 1/38* (2006.01)
*H01Q 3/36* (2006.01)
*H04B 7/0413* (2017.01)

(52) U.S. Cl.
CPC ....... *H01Q 1/2266* (2013.01); *G02B 27/0176* (2013.01); *H01Q 1/273* (2013.01); *H01Q 1/38* (2013.01); *H01Q 3/36* (2013.01); *G02B 2027/0178* (2013.01); *H04B 7/0413* (2013.01)

(58) Field of Classification Search
CPC ..................................................... H01Q 1/273
See application file for complete search history.

(56) References Cited

U.S. PATENT DOCUMENTS

| | | | | |
|---|---|---|---|---|
| 2012/0140101 A1* | 6/2012 | Afshari | .................. | H04N 23/57 348/335 |
| 2014/0340576 A1* | 11/2014 | Kim | ........................ | H01Q 1/00 348/375 |
| 2016/0064810 A1* | 3/2016 | Smith | .................... | H01Q 1/243 439/862 |
| 2016/0313628 A1* | 10/2016 | Brodie | .................... | H04N 23/00 |
| 2021/0103119 A1* | 4/2021 | Reckker | ................. | H04N 23/55 |
| 2021/0149224 A1* | 5/2021 | Zhang | .................... | H01Q 1/273 |
| 2021/0333823 A1* | 10/2021 | Maric | ................ | G02B 27/0176 |
| 2022/0113562 A1* | 4/2022 | Anderson | .............. | G02C 11/06 |

* cited by examiner

*Primary Examiner* — Dimary S Lopez Cruz
*Assistant Examiner* — Aladdin Abdulbaki
(74) *Attorney, Agent, or Firm* — Greenberg Traurig, LLP

(57) ABSTRACT

The disclosed system may include a support structure configured to structurally support various system components. The system may also include a camera housing, affixed to the support structure, that houses optical components for a camera. The system may further include an antenna, at least a portion of which is disposed on the camera housing, as well as an antenna feed that electrically connects the antenna to a receiver or a transmitter. Various other apparatuses, methods of manufacturing, and wearable devices are also disclosed.

17 Claims, 22 Drawing Sheets

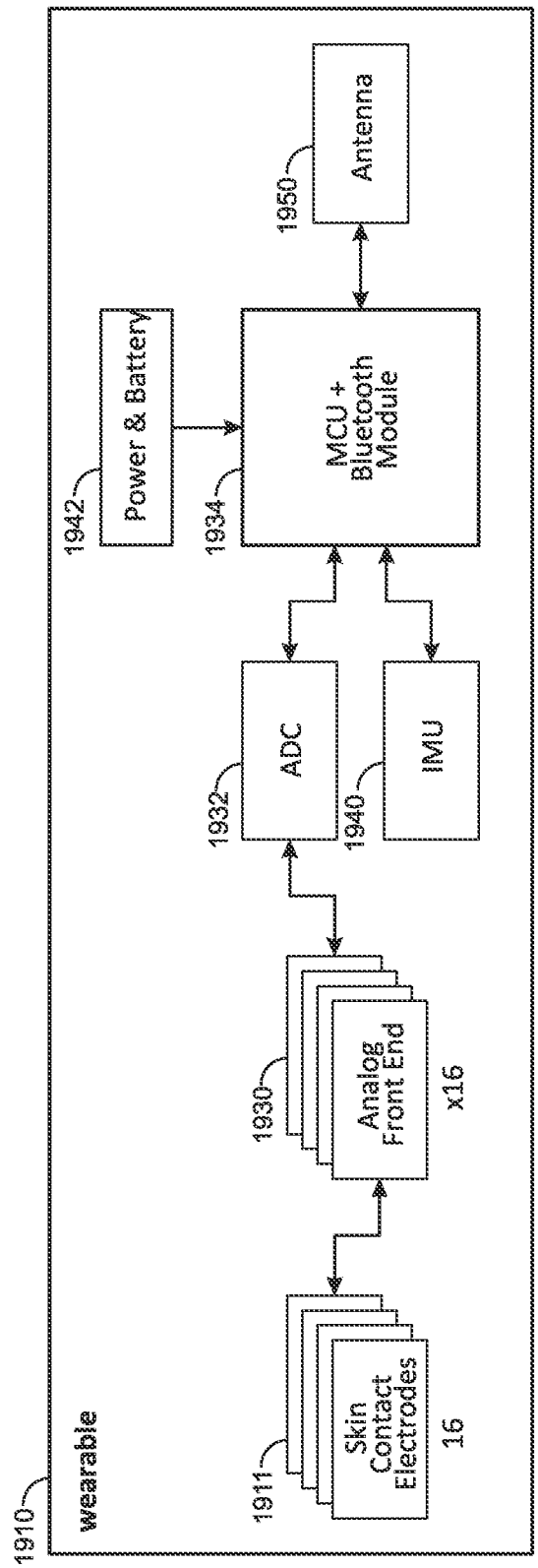
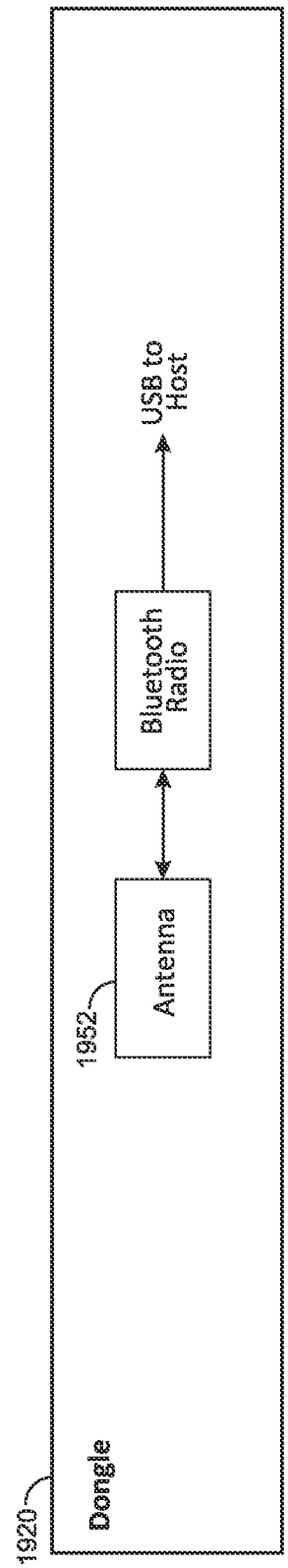
FIG. 19A
FIG. 19B

INTEGRATED CAMERA ANTENNA

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIGS. 19A and 19B are illustrations of an exemplary schematic diagram with internal components of a wearable system.

Figure 1A:
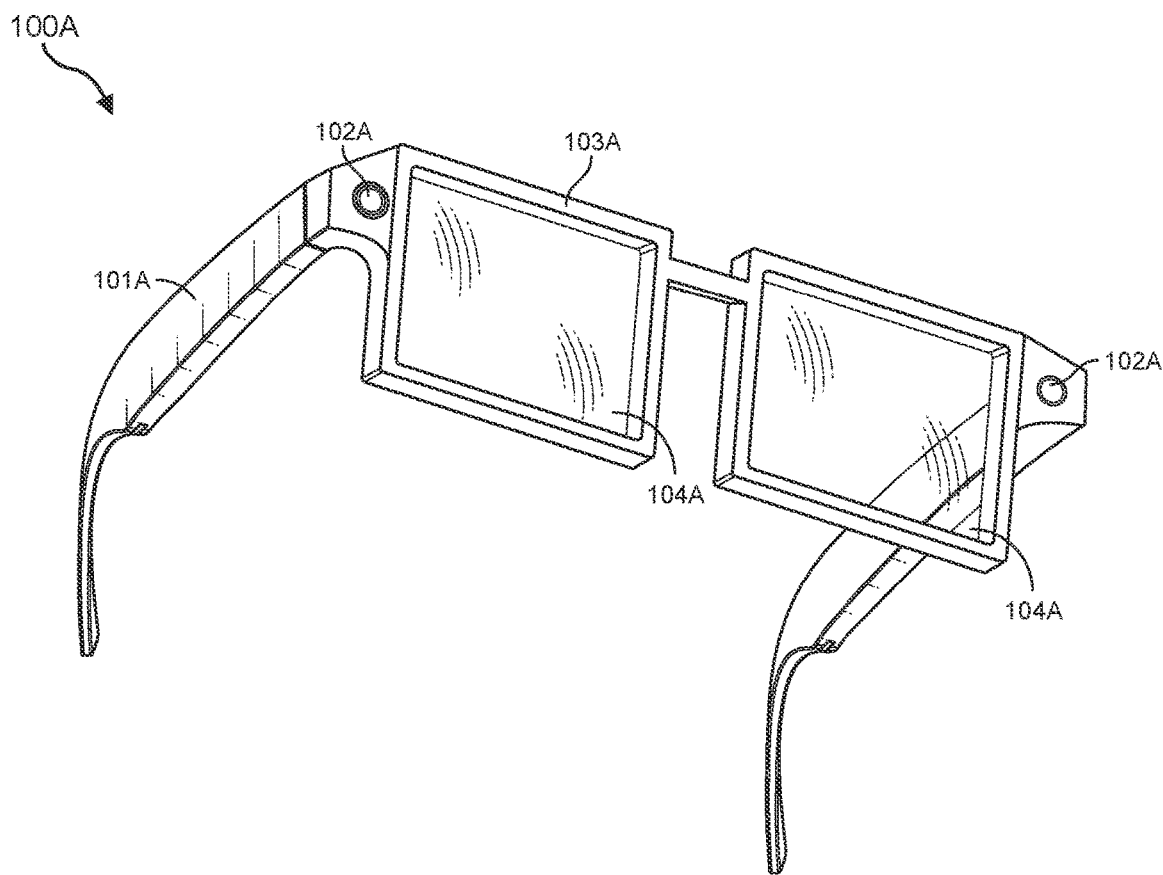
FIGS. 1A-1J illustrate various examples of augmented reality devices with which the integrated camera antennas described herein may be implemented.
Figure 1B:
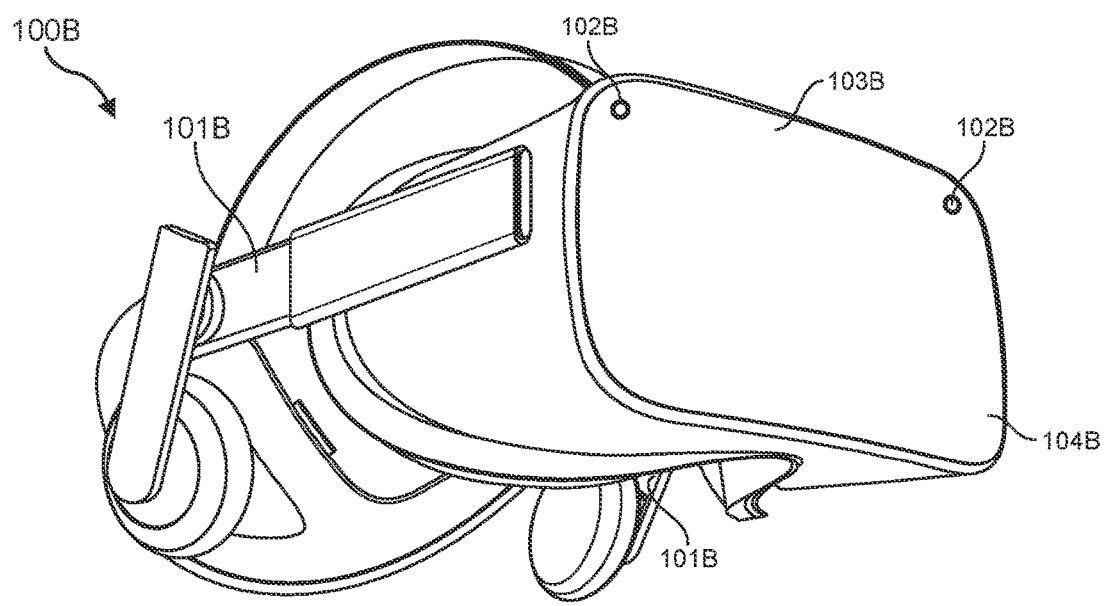
Figure 1C:
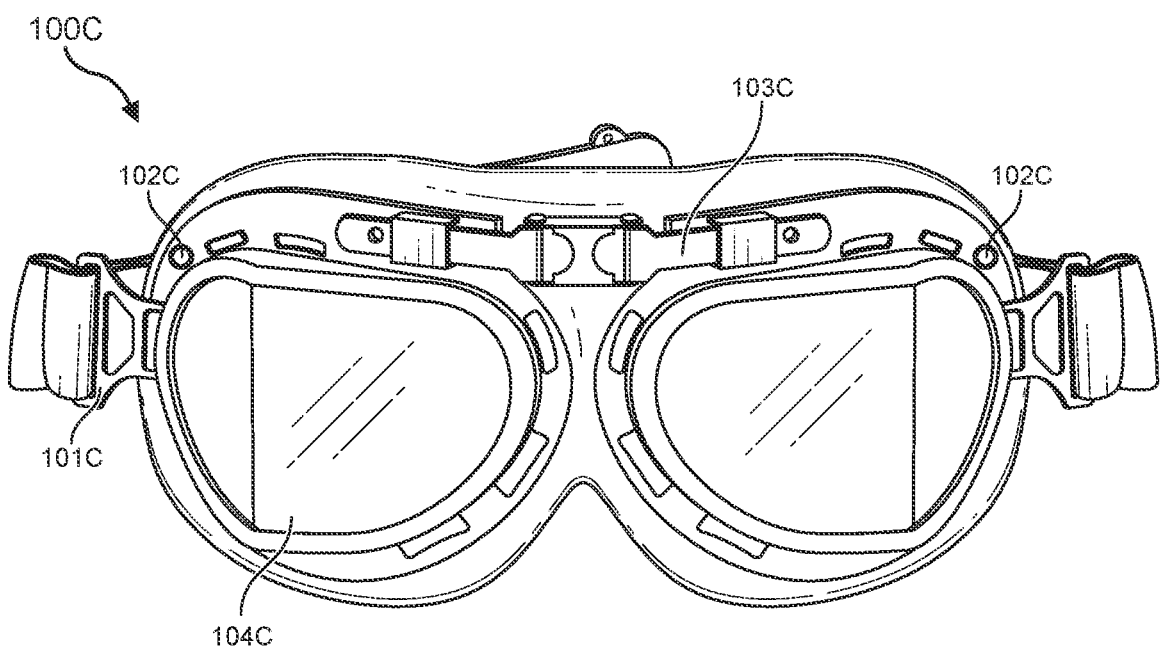
Figure 1D:
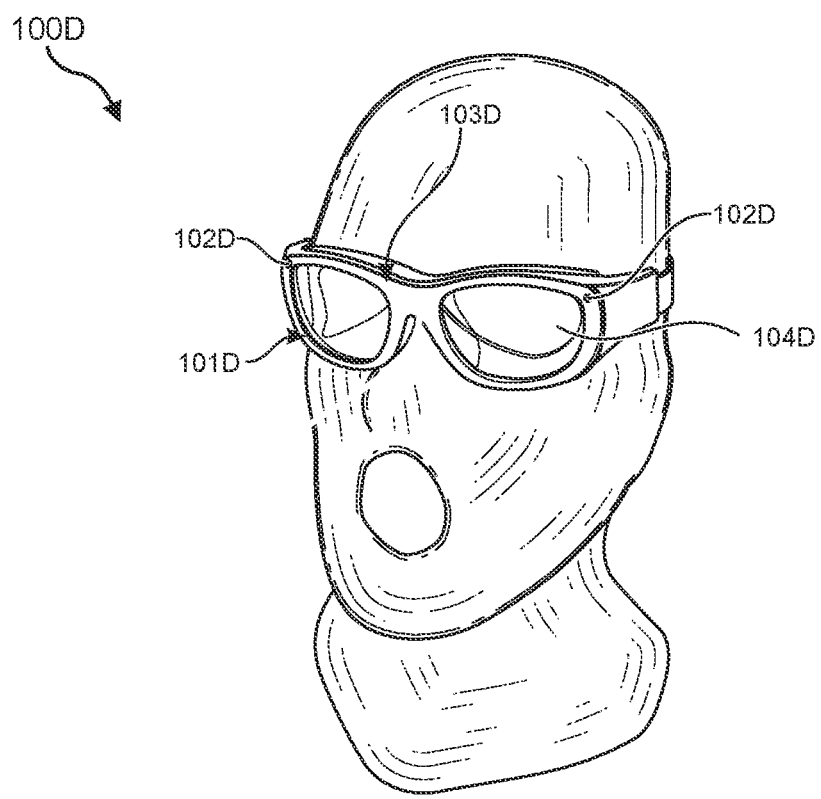
Figure 1E:
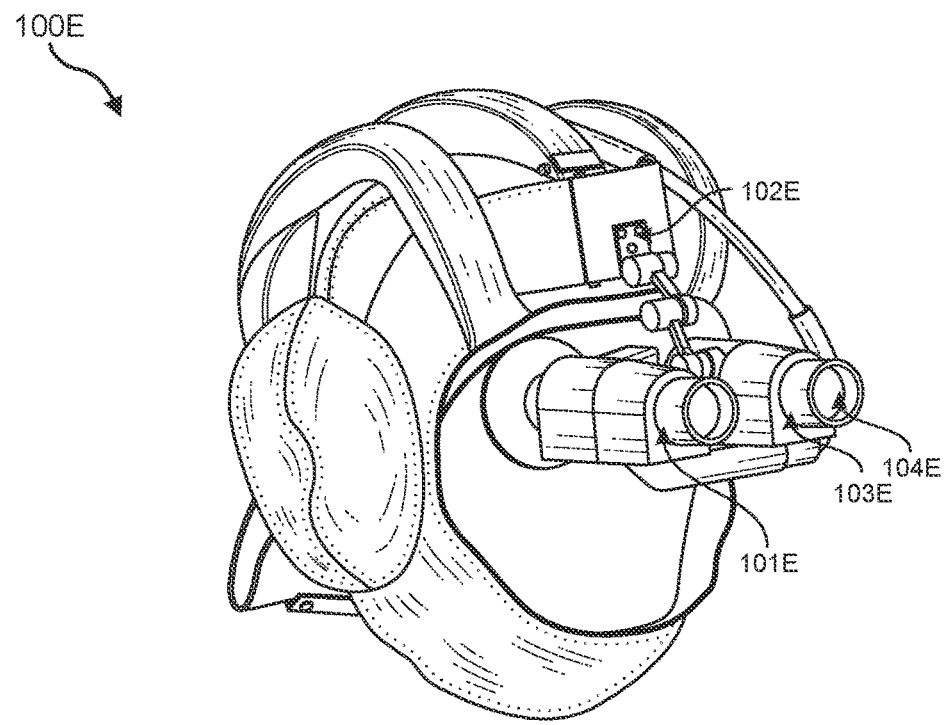
Figure 1F:
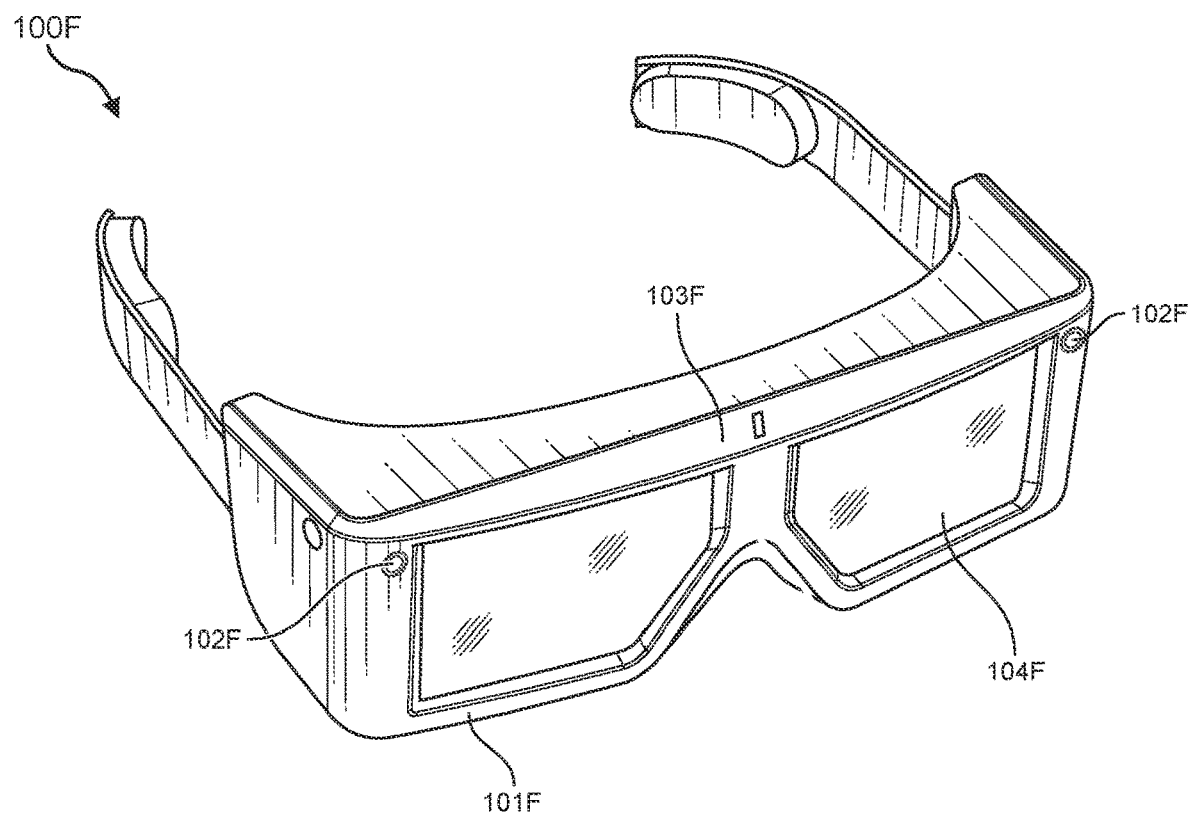
Figure 1G:
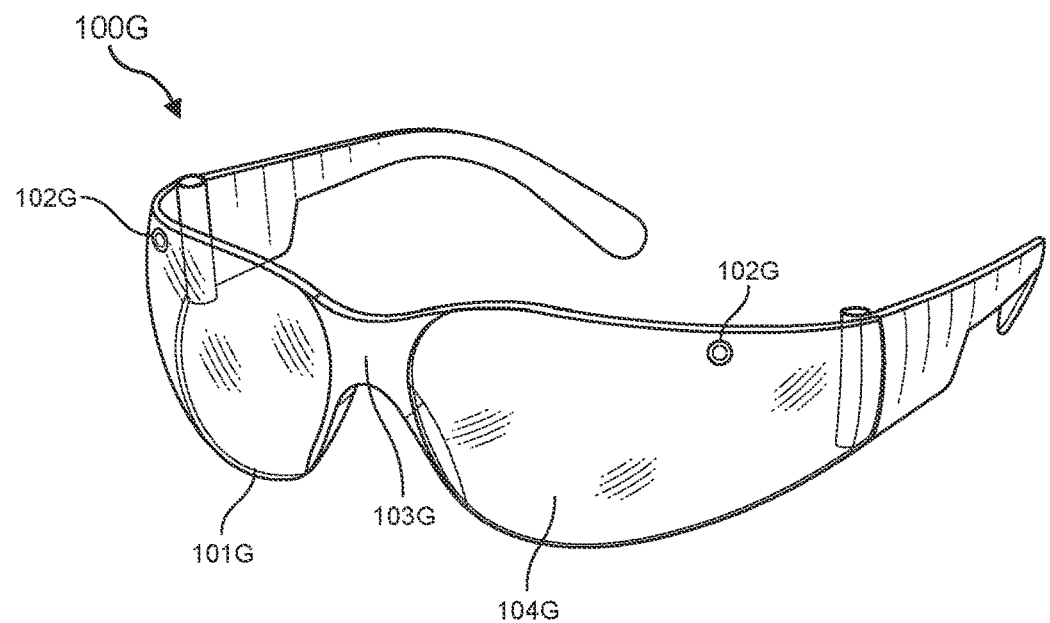
Figure 1H:
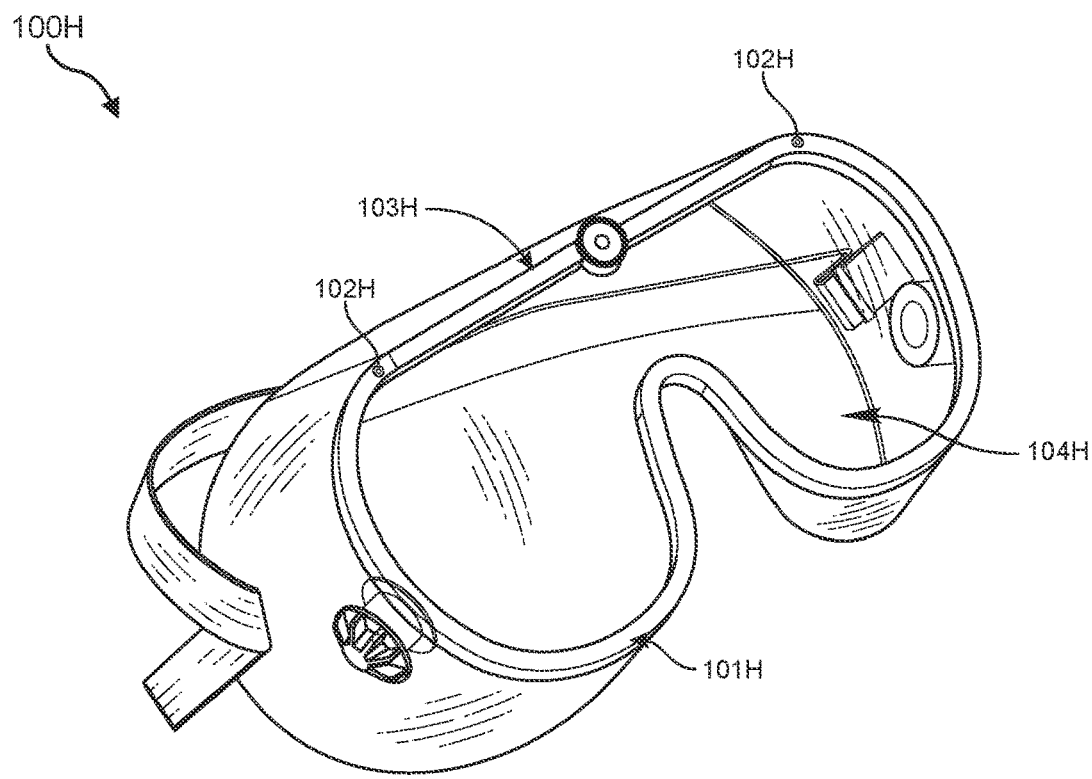
Figure 1I:
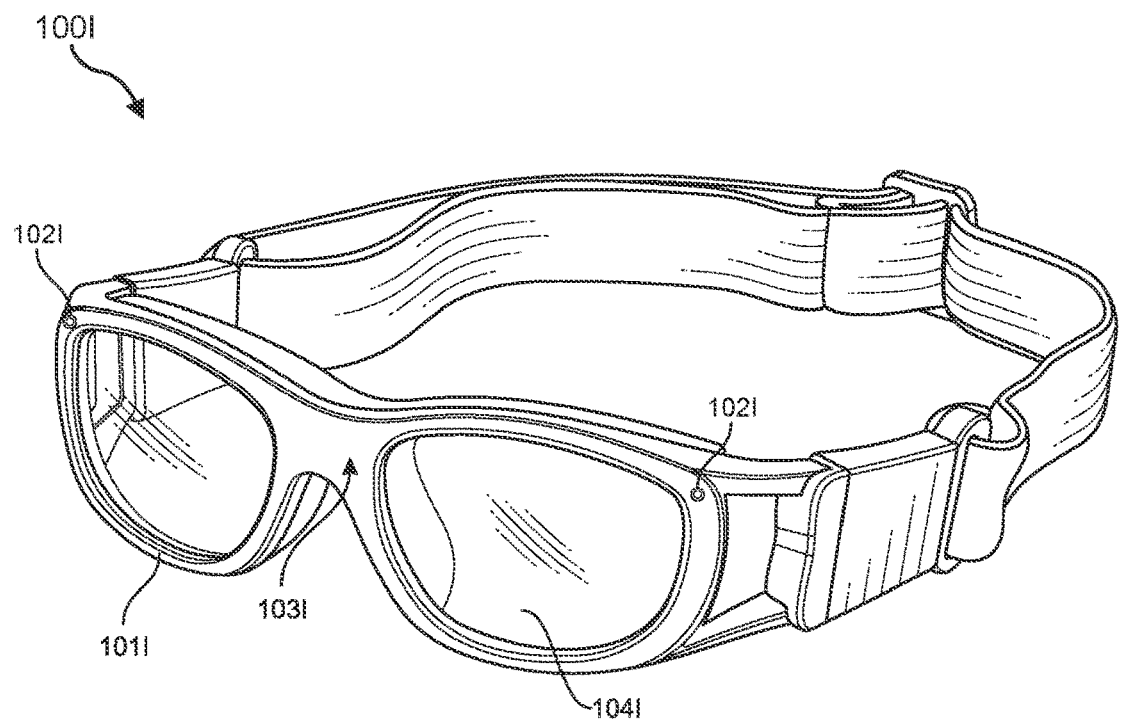
Figure 1J:
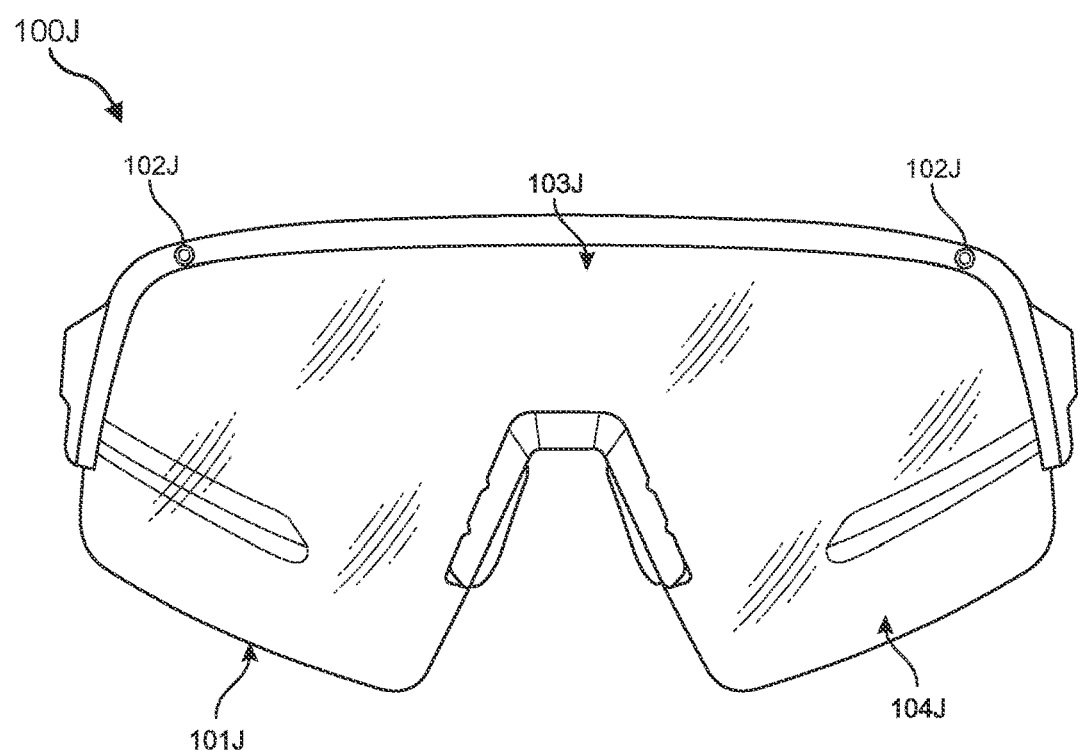

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality devices may include many different types of electronic hardware. In some cases, for example, artificial reality devices may include head-mounted displays (HMDs) that provide a virtual reality environment. In such cases, the HMD may fully cover the user's eyes, and the user may be entirely enveloped in the virtual environment. In other cases, artificial reality devices may include augmented reality glasses or other similar devices. In such cases, the augmented reality glasses may allow the user to still see the world around them, but may project virtual objects into the physical world. As such, the wearer of the augmented reality glasses may see real world objects as well as virtual objects that are projected onto the user's eyes by the augmented reality glasses. Smartphones, smartwatches, and other mobile electronic devices may be used in conjunction with these artificial reality devices.

In some cases, these artificial reality devices may be configured to communicate with other electronic devices, including the aforementioned mobile electronic devices, along with other devices including server computer systems. These server computer systems may be connected to computer networks that allow the servers to communicate with outside devices such as artificial reality systems. The servers may provide positioning information, display information, application information, or other types of data to the artificial reality device. The artificial reality device may receive this data (and may likewise transmit corresponding data) using antennas. These antennas may include WiFi antennas, Bluetooth antennas, global positioning system (GPS) antennas, cellular antennas (e.g., 5G, 6G, 7G, Ultrawideband (UWB)), near-field communication (NFC) antennas, or other types of antennas. In HMDs or augmented reality glasses, these antennas may be competing for limited space that is shared with other electronic components including speakers, microphones, batteries, cameras, printed circuit boards (PCBs), touch sensors, buttons, insulating or heat conducting materials for thermal management, or other components. Accordingly, due to tight form factor considerations, antennas are at times placed in inopportune locations that are close to a user's body, and particularly, close to the user's head.

The antennas' proximity to the user's head may lead to specific absorption rate (SAR) concerns. Indeed, many governmental institutions may place limits on how much energy radiating components such as antennas may emit. This may be particularly true for electronic components that lie immediately next to a user's skin and/or a user's head. Accordingly, in at least some embodiments described herein, one or more antennas of an artificial reality device may be placed either partially or entirely on the exterior portion of a camera module. In cases where the artificial reality device is a pair of augmented reality glasses, one or more cameras may be placed on an outer edge of the rim of the glasses on the outside above each eye. The positioning of the antennas on or around these cameras may place the antennas further away from the user's skin and further away from the user's head. This may greatly reduce SAR concerns and may, at least in some cases, provide improved antenna reception and transmission, with a reduced amount of noise when receiving and transmitting. Indeed, because the antenna is further from the user's head, the artificial reality device may use an increased amount of power to transmit and receive wireless signals. This increased power may lead to improved signal quality for the user. These and other concepts will be explained in greater detail below with regard to FIGS. 1-19B.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1A illustrates an embodiment of a pair of artificial reality glasses 100A. It should be noted that, while artificial reality glasses are shown in FIG. 1A, virtually any type of eyewear, head-mounted displays, virtual reality devices, or other head-worn systems may implement the embodiments described herein. Indeed, as shown in FIGS. 1B-1J, the embodiments described herein may be implemented on many different types of devices including on a virtual reality head-mounted device 100B of FIG. 1B, on a pair of aviator goggles 100C of FIG. 1C, on a pair of sport goggles 100D of FIG. 1D, on a pair of night-vision goggles 100E of FIG. 1E, on a pair of 3D goggles 100F of FIG. 1F, on a pair of protective glasses 100G of FIG. 1G, on a pair of protective goggles 100H of FIG. 1H, on a pair of sporting goggles 100I of FIG. 1I, on a ski mask 100J of FIG. 1J, or on other types of wearable devices.

The artificial reality glasses 100A of FIG. 1A may include temples or temple arms 101A. Each temple arm may include the same or different components including internal electronic components such as speakers, batteries, printed circuit boards (PCBs), or other components. Each temple arm 101A or other type of outer support structure (e.g., 101B-101J) may have temple tips which wrap around the user's head and hold the artificial reality glasses 100A (or other devices 100B-100J) onto the user's head. The artificial reality glasses 100A of FIG. 1A may also include lenses 104A (or 104B-104J). These lenses may be fully transparent or semi-transparent. The lenses 104A may be configured to allow at least some visibility into the user's surrounding environment, while still allowing one or more virtual images to be projected either onto the lenses or directly into the user's eyes.

Still further, the artificial reality and virtual reality devices 100A-100J may include one or more cameras 102A-102J. In some cases, the cameras may be configured to capture still images or live images (e.g., video feeds) of the user's surroundings. The cameras may include photodiodes that capture light passing through the camera's outer lenses. In some embodiments, the cameras 102A-102J may be positioned on an outer portion of the rims of the glasses. Indeed, the artificial reality and virtual reality devices 100A-100J may include a brow bar portion that, at least in some cases, includes a bridge that lies above a user's nose along the brow line above the user's eyes. The cameras 102A-102J may be positioned along the brow bar portions 103A-103J. In this position, the cameras 102A-102J may be placed further from the user's face and head. As such, in this position, the integrated camera antennas described herein may also be placed further from the user's face and head. This may reduce interference in received or transmitted signals, and may allow increased power to be used with the antennas.

Figure 2:
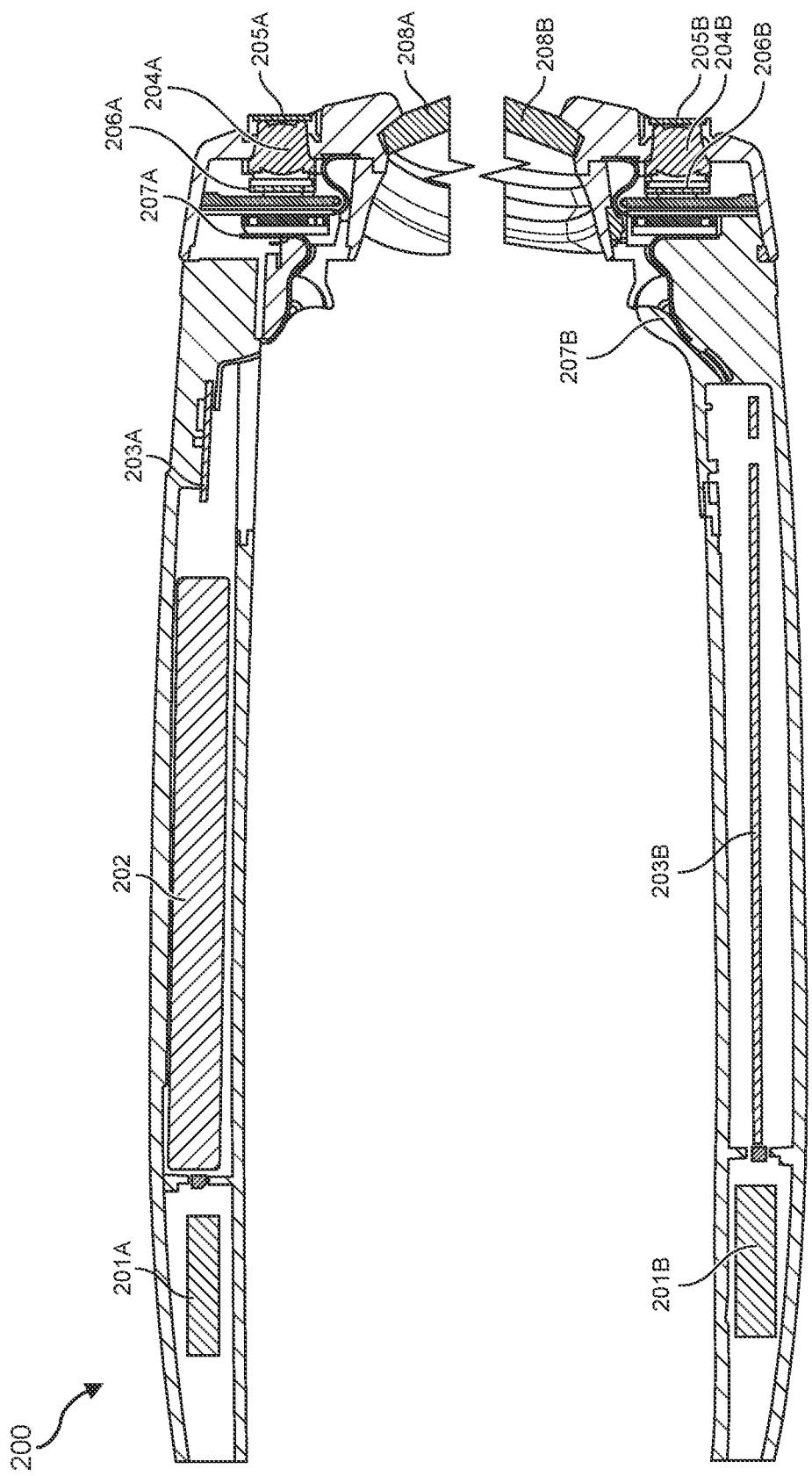
FIG. 2 illustrates a top view of an example pair of artificial reality glasses sans outer housing.

FIG. 2 illustrates an embodiment in which the outer covering of the artificial reality glasses 200 has been removed. The artificial reality glasses 200 may be similar to or the same as the artificial reality glasses 100 of FIG. 1. The artificial reality glasses 200 may include speakers 201A/201B, a battery 202 (among potentially other batteries), various PCBs 203A/203B, cameras 204A/204B, touch-sensitive buttons, heat dissipation elements (e.g., graphite heat sinks), and lenses 208A/208B. These components may be disposed on the temple arms and/or on the lens frames. The lens frames may be hingedly connected to the temple arms via hinges 207A/207B. The cameras 204A/204B may each have their own corresponding lenses 205A/205B for capturing light from the user's surrounding environment. The cameras 204A/204B in this embodiment may each have integrated antennas 206A/206B. The integrated antennas 206A/206B may be at least partially disposed on portions of the camera. For instance, each camera 204A/204B may have a camera barrel or other outer covering that provides support for the camera's lenses and other components.

In some embodiments, as will be explained further below, the various antennas described herein, including monopole, dipole, loop, slot, and others, may be plated on, molded on, or otherwise disposed on at least part of the cameras' outer coverings. By placing the antennas on or around the cameras, the embodiments herein may provide an integrated camera antenna that allows increased power usage or, alternatively, operates more efficiently on less power. Because the antennas are placed further from the user's face and head, the user's face and head cause less interference or desense to incoming or outgoing electromagnetic signals. Moreover, because the integrated camera antennas are further from the user's face and head, the embodiments herein may safely route more power to the antenna for increased transmission and reception capabilities when needed. These embodiments will be explained further below with regard to FIGS. 3A-11.

Figure 3A:
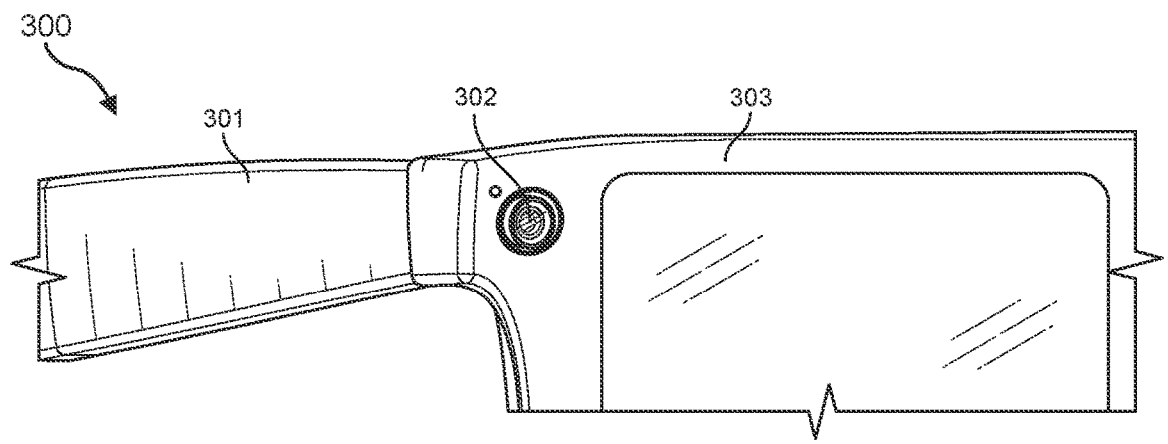
FIG. 3A illustrates an embodiment of an integrated camera antenna including an outer covering.

FIG. 3A illustrates an embodiment of a pair of artificial reality glasses 300 that includes a temple arm 301, a camera 302, and a brow bar 303. Each of these components, including the temple arm 301, the camera 302, and the brow bar 303 may include subcomponents that are affixed to an underlying support structure. In some cases, these subcomponents may be electronic components including batteries, PCBs, speakers, radios (e.g., WiFi, Bluetooth, global positioning system (GPS), cellular, near field communication (NFC), etc.), optics components configured to generate and project virtual images, and other components.

Figure 3B:
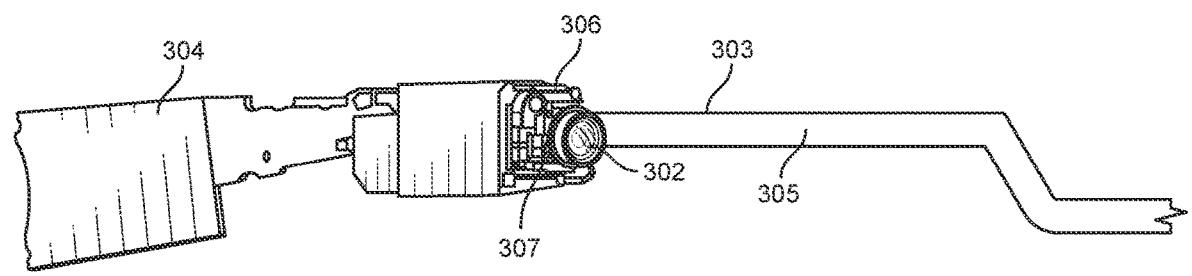
FIG. 3B illustrates an embodiment of an integrated camera antenna without an outer covering.

FIG. 3B illustrates an embodiment of the artificial reality glasses 300 in which portions of an antenna may stretch into the temple arm 301, the camera 302, and/or the brow bar 303. For example, element 304 may represent a conducting terminal of the antenna 307 that is disposed on at least a portion of the temple arm 301. Element 305 may represent a conducting terminal of the antenna 307 that is disposed on at least a portion of the brow bar 303. The various conducting terminals 304 and 305 may be connected to the camera integrated antenna 307 via a flexible connection 306. This flexible connection 306 may carry electromagnetic signals from the integrated camera antenna 307 (i.e., from the conducting terminals 304/305) to a processor or radio (e.g., a WiFi radio). Other antenna feed components may also be implemented within the artificial reality glasses 300 including amplifiers, signal processors, impedance matching circuitry, or other antenna feed components that provide received signals to a receiver or transmit signals generated by a transmitter. Indeed, the conducting terminals 304/305 may receive external wireless signals and pass those signals through the antenna feed to the radio receiver. And, in a similar manner, the radio transmitter may generate wireless signals that are transmitted through the antenna feed components and are propagated into the external environment via the conducting terminals 304/305. By placing the conducting terminals 304/305 in the illustrated positions along the temple arm 301 and the brow bar 303, the embodiments herein may provide a large surface area for each antenna conducting terminal, thereby leading to increased efficiency when receiving or transmitting signals.

Figure 4:
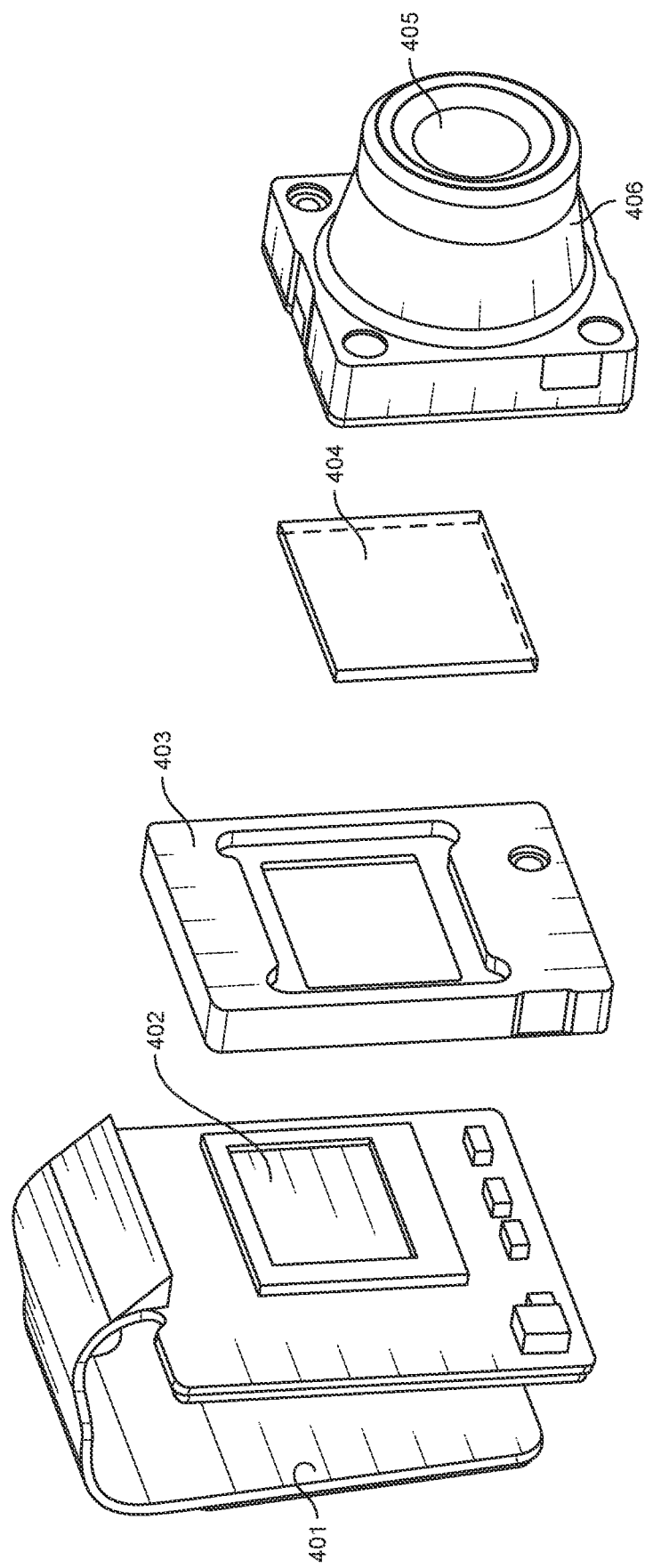
FIG. 4 illustrates an exploded view of an integrated camera antenna.

FIG. 4 illustrates an embodiment of an exploded view of a camera 405 and underlying structure into which an antenna may be integrated. As will be understood, the camera 405 may include a shutter that, when opened, allows external light to travel through lenses or filters 404 (e.g., an infrared filter) to a digital pixel sensor 402 such as a charge-coupled device (CCD). The CCD may include multiple photodiodes that are configured to detect frequencies of light and pass that information to data storage (e.g., static random-access memory (SRAM)). A filter holder 403 may be implemented to secure the filter 404 in place relative to the camera and relative to the digital pixel sensor 402. In some embodiments, portions of an antenna may be integrated onto the camera 405 or, more specifically, onto the outer body portion 406 of the camera. In such cases, the integrated camera antenna may be connected to other components, including the conducting terminals 304/305 of FIG. 3B, via a flexible connector 401. In some cases, that flexible connector 401 may be molded around or may be connected to or may be a part of the digital pixel sensor 402. This may be shown more clearly in embodiment 500 of FIG. 5.

Figure 5:
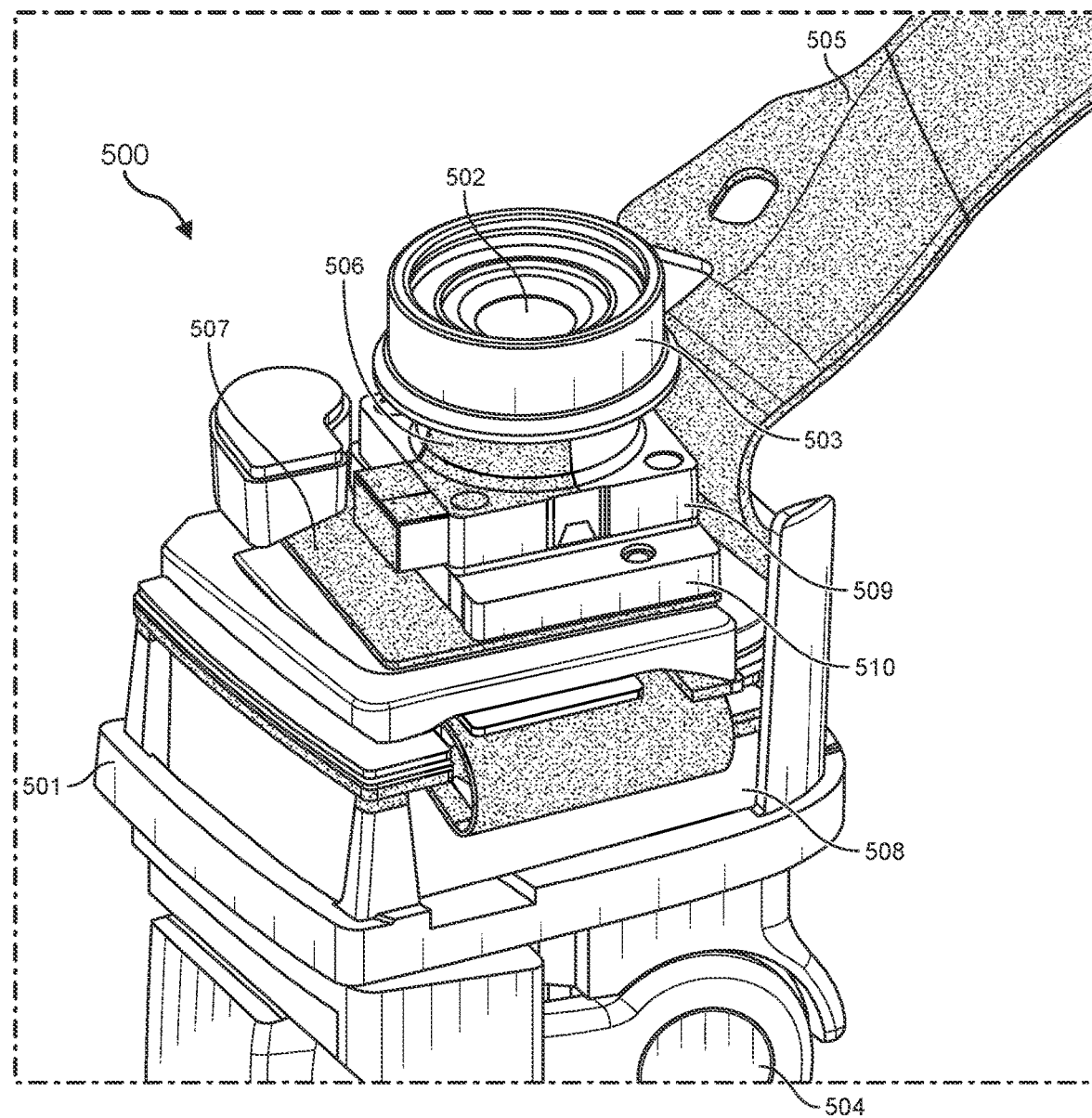
FIG. 5 illustrates a perspective view of an integrated camera antenna.

Embodiment 500 of FIG. 5 illustrates an integrated camera antenna in which at least a portion of an antenna 506 is integrated into camera 502. Indeed, the shaded portion of 506 indicates that at least a portion of the antenna is applied to or disposed on the outer surface of the camera 502. The camera and other components may be affixed to a support structure 501 that structurally supports various electronic, mechanical, and other components, and is connected to the temple arms via a hinge 504. The camera may have a housing 503 that is affixed to the support structure 501. The camera housing 503 may include one or more optical components for the camera 502 including lenses and a shutter (e.g., inside shutter housing 509), a filter (e.g., inside filter housing 510), and potentially other optical components. The integrated camera antenna 506 may be integrated onto a barrel portion of the camera housing 503, as well as onto the shutter housing 509 and/or onto the filter housing 510. The conducting terminal 505 (which extends over the brow bar) and potentially another conducting terminal (not shown) that may extend into the temple arm may connect to the antenna 506 via a connector 508 such as a flex connector. The flex connector may ground the antenna and may further connect the antenna to an antenna feed with a corresponding radio (having a transmitter and receiver), with amplifiers, with impedance matching circuits, and potentially other electronic components.

In some embodiments, the antenna 506 may be formed from or may include one or more conductive traces that are applied onto an outer surface of the camera housing 503. In some cases, the conductive traces of the antenna 506 may be plated onto the outer surface of the camera housing 503. In such cases, the outer surface of the camera housing 503 may be prepared for plating using a manufacturing process referred to as laser direct structuring (LDS). LDS may be used to print an antenna pattern for the antenna 506 on at least a portion of the camera housing 503. Then, after LDS has etched or printed the pattern for the antenna 506 onto the outer surface of the camera housing 503, the conductive material (e.g., copper or other conductive metals) may be plated onto the camera housing 503. Because the camera housing has been prepared using LDS, the conductive material will adhere to those portions of the housing that were etched or printed using LDS. As such, LDS may be used to etch the plastic camera body and activate the material such that, after plating in a metal bath, traces may be formed on the camera body.

Figure 6:
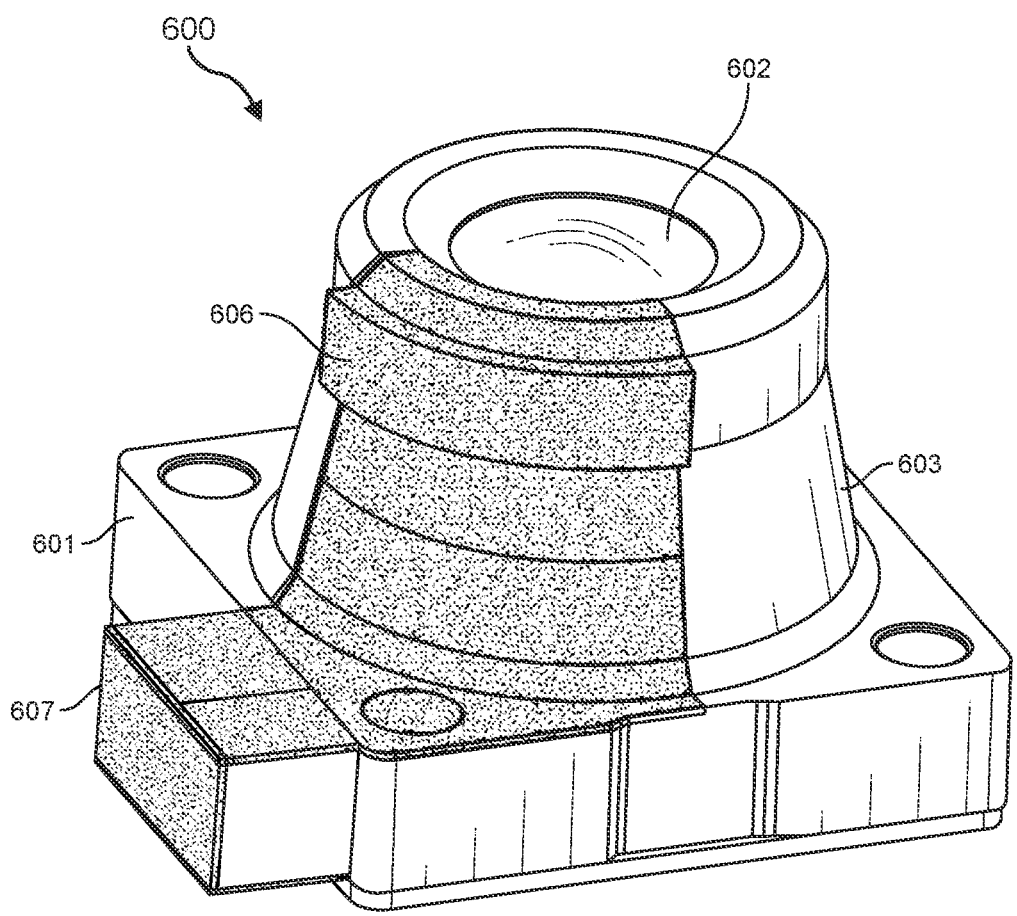
FIG. 6 illustrates an integrated camera antenna applied to an outer surface of a camera barrel.

In some cases, as shown in FIG. 6, the conductive traces 607 of the antenna 606 may be applied to a barrel portion 603 of the camera housing. As can be seen in embodiment 600 of FIG. 6, conductive traces (indicated by shading) may be placed on some or all of the exterior surface of the camera housing. The conductive traces 607 may be made of metal (e.g., copper) or may be made of conductive foam or other conductive material. In some cases, the antenna 606 may be grounded to the camera barrel 603 using such conductive materials. The conductive traces 607 may extend onto and/or around certain structures, including the camera 602, the filter support structure 601, and potentially other components.

Figure 7:
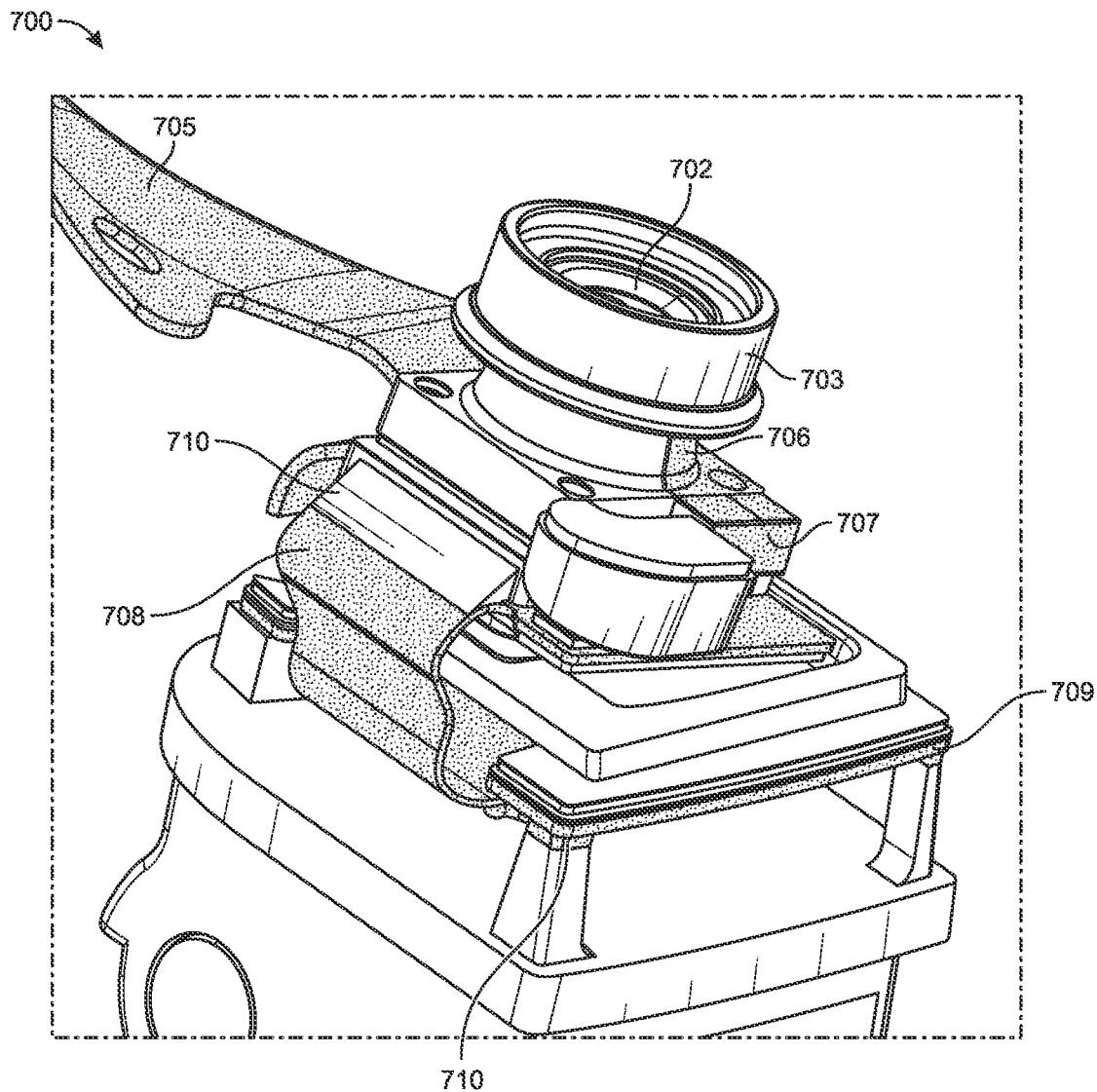
FIG. 7 illustrates an alternative perspective view of an integrated camera antenna.

FIG. 7 illustrates an embodiment of an integrated camera antenna 700. The integrated camera antenna 700 may include a camera 702 and a camera body 703. The antenna 706 and its associated traces 707 may be applied to some or all of the camera body 703. The antenna may include a conductive portion 705 that extends at least partially into the brow bar that sits over a user's eye. The antenna 706 may also include other conductive portions including traces 707. The integrated camera antenna 700 may also include a spring clip 710 that is configured to connect the antenna to a flexible connector 708 or similar type of conductive connector. The flexible connector 708 may connect the antenna to grounding pins 709 and/or to antenna feed electronics including radios, amplifiers, impedance matching circuits, and other electronic components that may be disposed on a printed circuit board (PCB). In some embodiments, the flexible connector 708 may additionally be used to transfer camera image data to the electronic components of the PCB. Thus, in some cases, the flexible connector 708 may serve a dual function to both carry antenna data and to carry camera image data between the antenna and the PCB and between the camera and the PCB.

Figure 8:
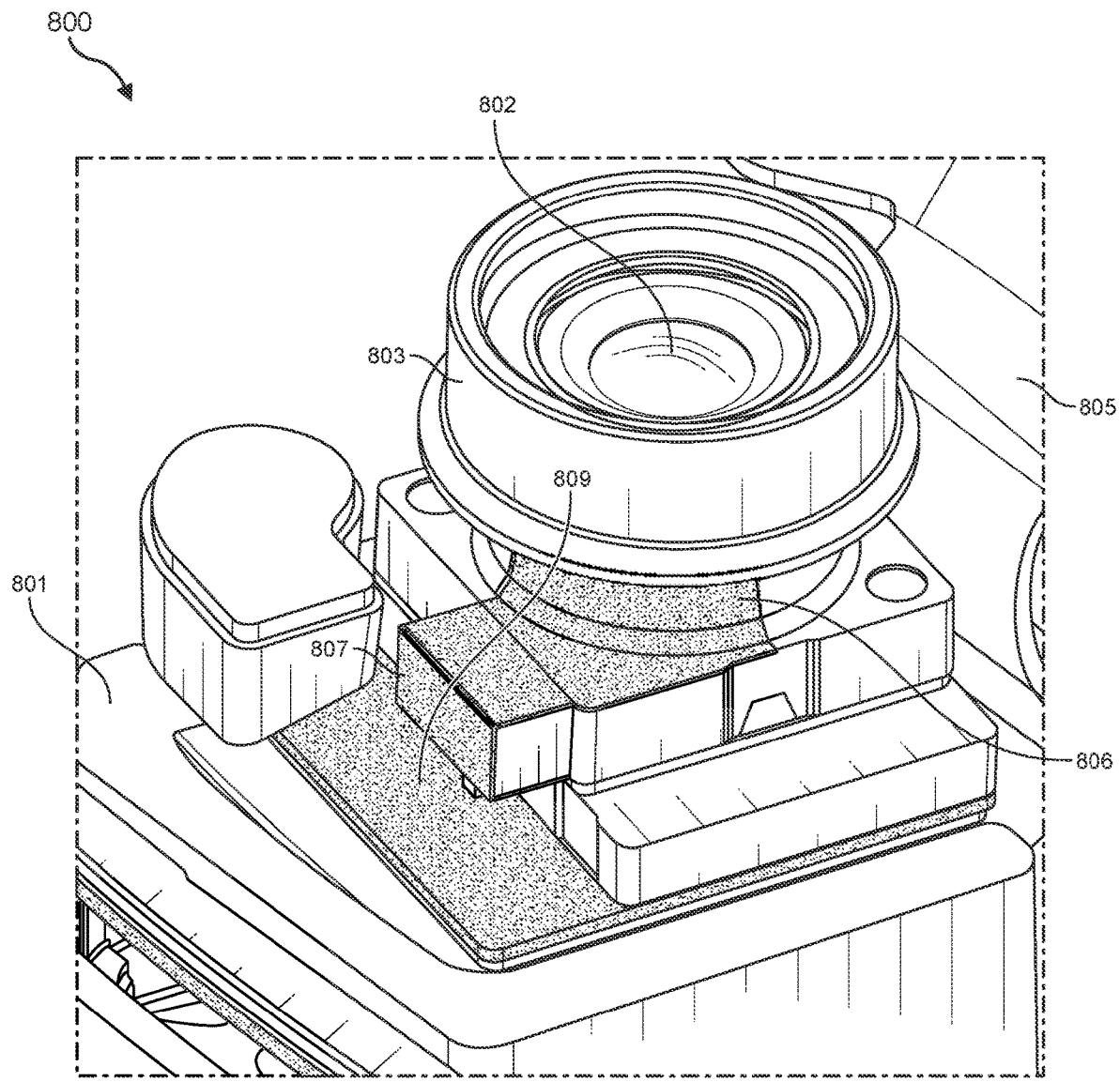
FIG. 8 illustrates a close-up view of an integrated camera antenna.

FIG. 8 illustrates an alternative embodiment of an integrated camera antenna 800. In this embodiment, the antenna 806 may extend partially around the camera body 803. The antenna 806 and its traces 807 and 809 may connect the antenna to a grounding arm and/or to various electronic components mounted within a support structure 801. The antenna 806 may include a conductive arm 805 and potentially other conductive arms. In some embodiments, the integrated camera antenna may be a monopole antenna, while in other cases, the integrated camera antenna 800 may be a dipole antenna, a loop antenna, a slot antenna, or may implement another antenna design. The antenna and its conductive arms and traces may extend up to the lens of the camera 802 and may extend partially or completely around the camera body 803.

Figure 9:
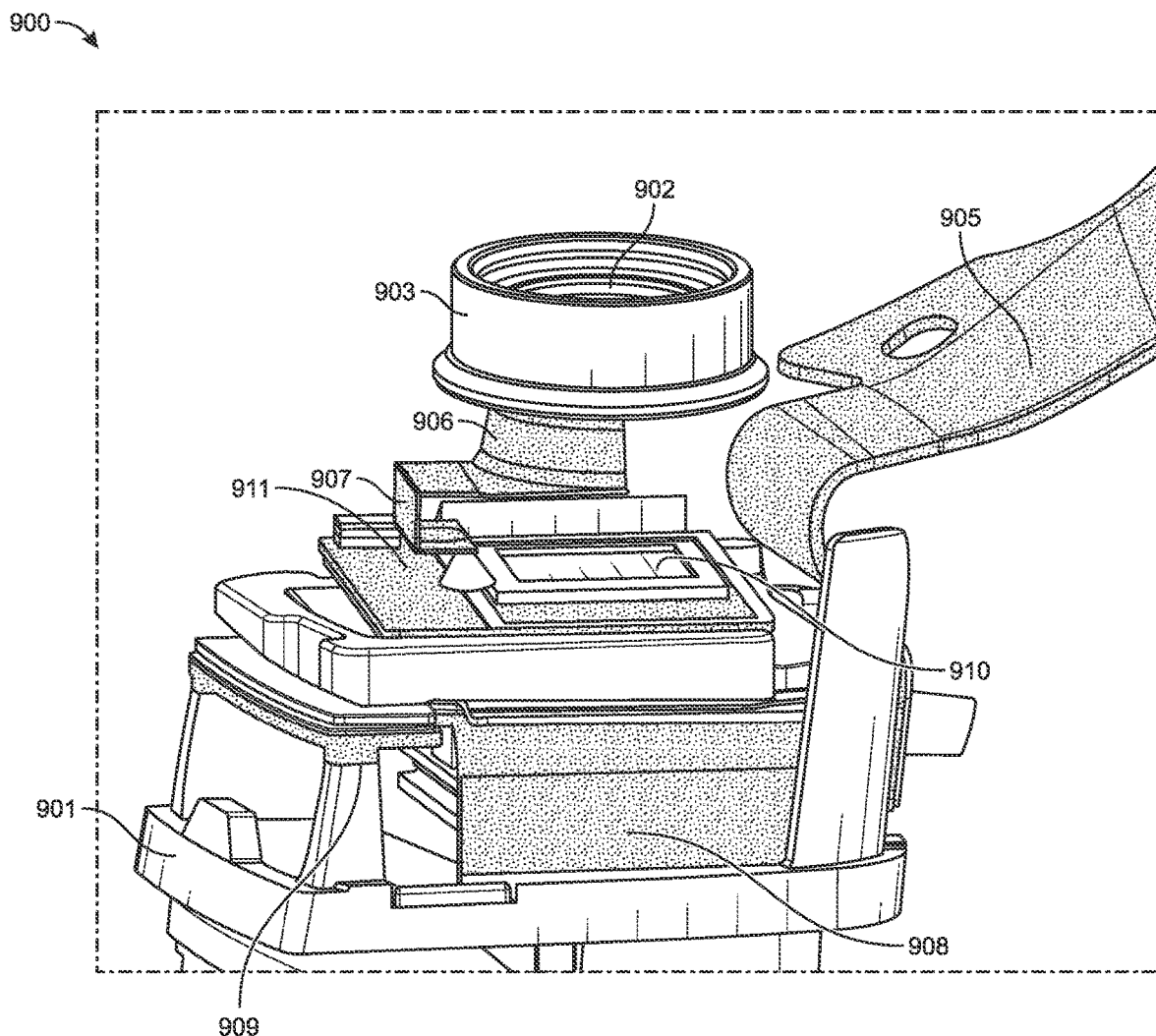
FIG. 9 illustrates an alternative perspective view of an integrated camera antenna.

FIG. 9 illustrates an embodiment of an integrated camera antenna 900 in which a grounding arm 911 may be configured to ground the antenna 906. The integrated camera antenna 900 may include a camera 902 with a camera body 903, along with traces 907 that connect to conductive arms (e.g., 905), flex connectors (e.g., 908), an image sensor 910, and other electronic components that may be disposed on a PCB secured by a support structure 901. The integrated camera antenna 900 may also include a grounding arm 911 that either grounds the antenna 906 directly, or connects the antenna 906 to one or more grounding pins 909. In some cases, the antenna 906 may be electrically connected to a flexible connector 908 that is itself grounded to another conductive component such as another flexible connector. In other cases, the antenna 906 may be is electrically connected to the flexible connector 908, and the flexible connector may be grounded to a second flexible connector and/or one or more grounding pins 909. These grounding pins may themselves be grounded to a metal hinge (e.g., 504 of FIG. 5) or to a metal subframe. In some cases, WiFi radios or other types of radios may be placed on the temple arm of the artificial reality device. As such, the traces may route through the hinge. This may be shown in greater detail in FIG. 10.

Figure 10:
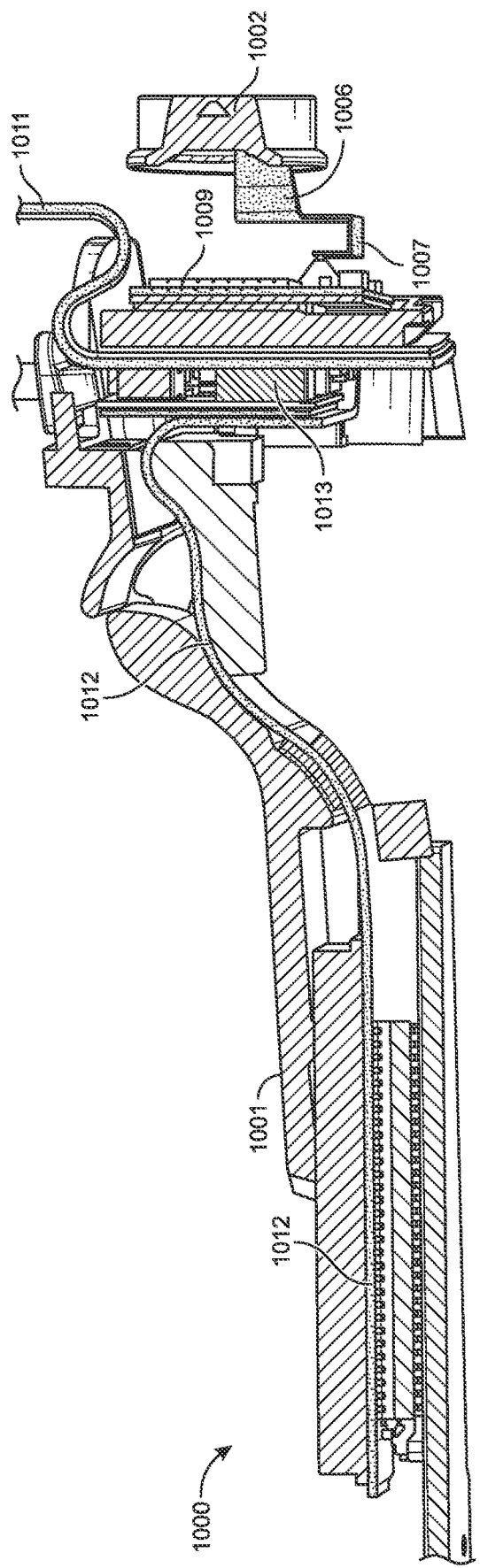
FIG. 10 illustrates a top view of an integrated camera antenna including a trace that flows through a hinge.

FIG. 10 illustrates an embodiment of an integrated camera antenna 1000 that has a temple arm portion 1001 that may be hingedly connected to a camera 1002, along with its camera body, an antenna 1006, and other components disposed on a PCB 1009. The temple arm portion 1001 may be connected to the camera 1002 and other electronics via a flex connector 1012 (e.g., a four-layer flex connector), via a coplanar waveguide, or via another connection means that is capable of being bent at a hinge point. The flex connector 1012 may connect to other conductive elements (e.g., 1011), as well as traces 1007 extending from the antenna 1006. In some embodiments, the antenna 1006 and/or traces 1007 may be grounded via a grounding mechanism 1013 that may be connected to various grounding pins on the integrated camera antenna 1000.

Figure 11:
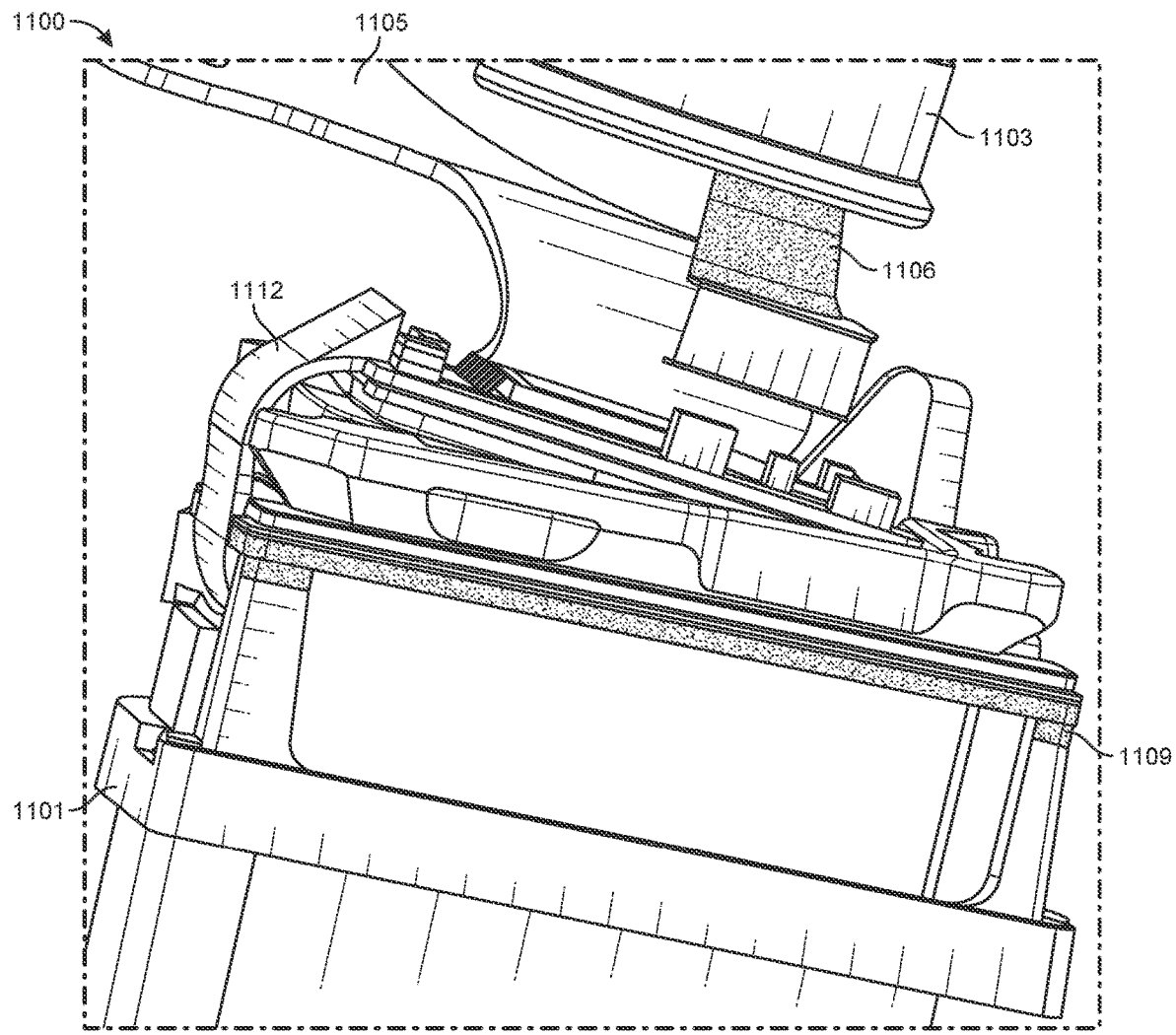
FIG. 11 illustrates an alternative perspective view of an integrated camera antenna.

FIG. 11 illustrates an integrated camera antenna 1100 that shows a close up view of a flex connector 1112 that connects the antenna 1106 and/or conductive element 1105 to grounding pins 1109 and other electronic components. The grounding pins may be affixed to a support structure 1101 and/or to other components. As with the embodiments above, the antenna 1106 may be disposed on some or all of the camera body 1103. The flex connector 1112 may connect the internal components including the antenna 1106 to a temple arm radiating component and/or other radiating members. In some cases, a similar structure may be implemented on an opposite side of a pair of artificial reality glasses.

For example, as shown in FIG. 1, a wearable device (e.g., 100) may include a support structure 101A/101B that is configured to structurally support various system components including a camera housing that houses optical components for the camera 102A/102B. The wearable device may also include an antenna (e.g., 206A/206B of FIG. 2), at least a portion of which is disposed on the camera housing 204A/204B. Still further, the wearable device may include an antenna feed that electrically connects the antenna to a receiver or a transmitter. In some cases, the wearable device may also include a processor (e.g., a CPU or GPU) that is configured to process radio signals received by the receiver and process radio signals that are to be transmitted by the transmitter. In some cases, the wearable device may be a pair of artificial reality glasses, while in other cases, the wearable device may be a head-mounted display, a smartwatch, or other wearable electronic device. In cases where the wearable device is a pair of artificial reality glasses, the artificial reality glasses may include a browline portion (e.g., brow bar 303) and a temple arm portion (e.g., temple arm 301). In such cases, at least a portion of the antenna may be at least partially disposed over the browline portion, and at least a portion of the antenna may be at least partially disposed over the temple arm portion. Using these portions of space on the artificial reality glasses may extend the range and efficiency of the antenna, and may keep the majority of the antenna away from the user's face and skin.

In some cases, the wearable device may include another camera housing that is affixed to the support structure. This second camera housing may house various optical components for another camera. This second camera housing may also have at least a portion of a second antenna disposed thereon. In some cases, the wearable device may include three, four, or more cameras, camera housings, and associated antennas. In cases where multiple antennas are used, at least two of the antennas may be implemented in a multiple input multiple output (MIMO) manner to increase data transfer through the receiver or through the transmitter. Thus, both (or multiple) antennas may be used in tandem in MIMO mode, which increases signal strength on reception and increases transmission efficiency on transmission.

Any of the antennas used in this configuration may be monopole antennas, dipole antennas, loop antennas, slot antennas, or other types of antennas. Moreover, the antennas may be configured to work with ultrawideband (UWB), WiFi 6, WiFi 7, 2.4 GHz to 8 GHz frequencies, WiFi, Bluetooth, cellular, GPS, and other electromagnetic bands. In some cases, UWB may allow the wearable device to perform ranging using the two or more antennas. Moreover, UWB may allow the wearable device to perform object location by comparing phase differences in signals received at the two (or more) different antennas. Indeed, because the cameras 102A and 102B are sufficiently far apart, signals arriving at the two antennas disposed on those cameras may be distinguished based on the time difference of arrival of the signals. This time difference may then be used to perform object location within the user's environment.

Figure 12:
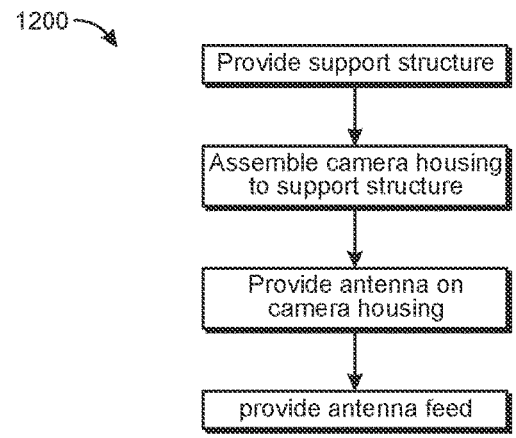
FIG. 12 illustrates a flow diagram of an exemplary method of manufacturing an integrated camera antenna.

FIG. 12 is a flow diagram of an exemplary computer-implemented method of manufacturing 1200 for manufacturing an integrated camera antenna. The steps shown in FIG. 12 may be performed by any suitable computer-executable code and/or computing system, including the system illustrated herein. In one example, each of the steps shown in FIG. 12 may represent an algorithm whose structure includes and/or is represented by multiple sub-steps, examples of which will be provided in greater detail below.

Method of manufacturing 1200 may include, at step 1210, providing a support structure (e.g., 501 of FIG. 5) configured to structurally support one or more system components. Method 1200 may next include, at step 1220, assembling a camera housing 503 to the support structure 501. The camera housing 503 may be configured to house various optical components for the camera 502. Still further, the method 1200 may include, at step 1230, providing an antenna 506, at least a part of which is disposed on the camera housing 503. Moreover, the method 1200 may include, at step 1240, providing an antenna feed 507 that electrically connects the antenna 506 to a receiver or a transmitter. The various components may be assembled and electrically connected to radios, processors, or other electronic components. The method 1200 may be implemented to manufacture substantially any of the integrated camera antennas shown in FIGS. 1-11.

In this manner, the systems, methods, and wearable devices described herein may implement an integrated camera antenna that has at least a portion of the camera disposed on the camera body. Placing at least some of the antenna on the camera body allows more space for audio components, batteries, PCBs and related circuitry, thermal management components, touch buttons or physical buttons, etc. Placing the antenna on the camera may offer significant spacing from the user's head and may thus reduce the impact of user's head on antenna performance. Still further, placing the antenna on the camera body may offer significant spacing from the user's head, thereby lowering energy absorption by the user's head. In some cases, this may assist in meeting governmental absorption rate requirements without reducing transmission power as the antenna is located further from the user's head.

EXAMPLE EMBODIMENTS

Example 1: A system may include a support structure configured to structurally support one or more system components, a camera housing, affixed to the support structure, that houses one or more optical components for a camera, an antenna, at least a portion of which is disposed on the camera housing, and an antenna feed that electrically connects the antenna to a receiver or a transmitter.

Example 2: The system of Example 1, wherein the antenna includes one or more conductive traces that are applied onto an outer surface of the camera housing.

Example 3: The system of Example 1 or Example 2, wherein the outer surface of the camera housing is prepared for plating using laser direct structuring (LDS).

Example 4: The system of any of Examples 1-3, wherein LDS is implemented to print an antenna pattern for the antenna on at least a portion of the camera housing.

Example 5: The system of any of Examples 1-4, wherein the conductive traces are applied to a barrel portion of the camera housing.

Example 6: The system of any of Examples 1-5, wherein the antenna is grounded to the camera barrel using a conductive material.

Example 7: The system of any of Examples 1-6, further comprising a spring clip that is configured to connect the antenna to a flexible connector.

Example 8: The system of any of Examples 1-7, wherein the flexible connector connects the antenna to electronic circuitry disposed on a printed circuit board.

Example 9: The system of any of Examples 1-8, wherein the flexible connector comprises a same flexible connector used to transfer camera image data to the electronic circuitry disposed on the printed circuit board.

Example 10: The system of any of Examples 1-9, further comprising a grounding arm configured to ground the antenna.

Example 11: The system of any of Examples 1-10, wherein the antenna is electrically connected to a flexible connector, and wherein the flexible connector is grounded to a second flexible connector.

Example 12: The system of any of Examples 1-11, wherein the antenna is electrically connected to the flexible connector, and wherein the flexible connector is grounded to the second flexible connector and to one or more grounding pins.

Example 13: The system of any of Examples 1-12, wherein the grounding pins are grounded to one or more metal hinges.

Example 14: A wearable device may include a support structure configured to structurally support one or more system components, a camera housing, affixed to the support structure, that houses one or more optical components for a camera, an antenna, at least a portion of which is disposed on the camera housing, and an antenna feed that electrically connects the antenna to a receiver or a transmitter.

Example 15: The wearable device of Example 14, further comprising a processor configured to process radio signals received by the receiver and process radio signals that are to be transmitted by the transmitter.

Example 16: The wearable device of Example 14 or Example 15, wherein the wearable device comprises a pair of artificial reality glasses.

Example 17: The wearable device of any of Examples 14-16, wherein the artificial reality glasses include a browline portion, and wherein at least a portion of the antenna is at least partially disposed over the browline portion.

Example 18: The wearable device of any of Examples 14-17, further comprising: a second camera housing, affixed to the support structure, that houses one or more optical components for a second camera, and a second antenna, at least a portion of which is disposed on the second camera housing.

Example 19: The wearable device of any of Examples 14-18, wherein the first and second antennas are implemented in a multiple input multiple output (MIMO) manner to increase data transfer through the receiver or through the transmitter.

Example 20: The wearable device of any of Examples 14-19, wherein the antenna comprises at least one of a monopole antenna, a dipole antenna, or a loop antenna.

Example 21: A method of manufacturing may include providing a support structure configured to structurally support one or more system components, assembling a camera housing to the support structure, the camera housing being configured to house one or more optical components for the camera, providing an antenna, at least a portion of which is disposed on the camera housing, and providing an antenna feed that electrically connects the antenna to a receiver or a transmitter.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
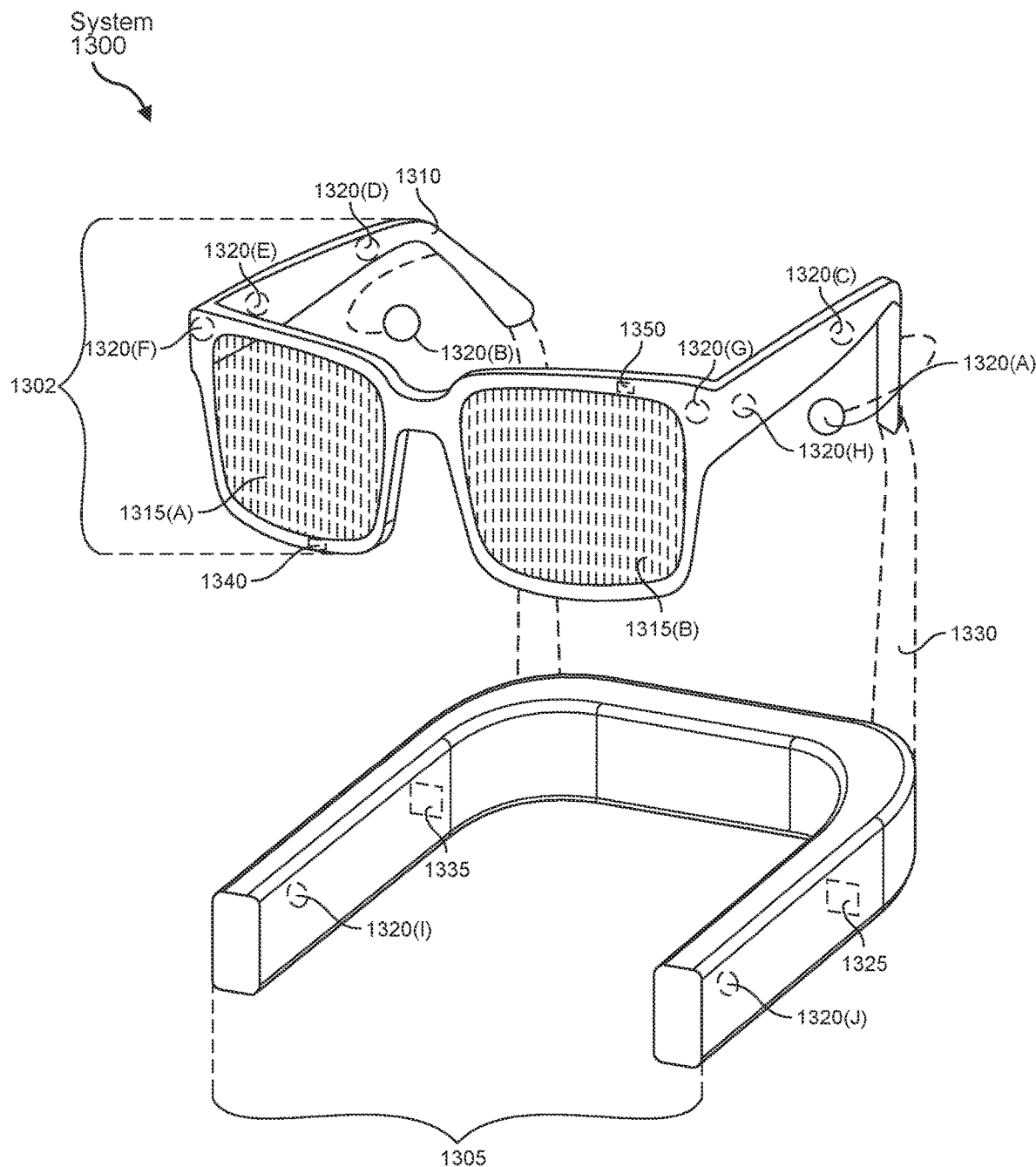
FIG. 13 is an illustration of exemplary augmented-reality glasses that may be used in connection with embodiments of this disclosure.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

In some examples, augmented-reality system 1300 may also include a microphone array with a plurality of acoustic transducers 1320(A)-1320(J), referred to collectively as acoustic transducers 1320. Acoustic transducers 1320 may represent transducers that detect air pressure variations induced by sound waves. Each acoustic transducer 1320 may be configured to detect sound and convert the detected sound into an electronic format (e.g., an analog or digital format). The microphone array in FIG. 13 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on frame 1310, and/or acoustic transducers 1320(I) and 1320(J), which may be positioned on a corresponding neckband 1305.

In some embodiments, one or more of acoustic transducers 1320(A)-(J) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality system 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a BLUETOOTH connection). In still other embodiments, acoustic transducers 1320(A) and 1320(B) may not be used at all in conjunction with augmented-reality system 1300.

Acoustic transducers 1320 on frame 1310 may be positioned in a variety of different ways, including along the length of the temples, across the bridge, above or below display devices 1315(A) and 1315(B), or some combination thereof. Acoustic transducers 1320 may also be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, e.g., the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1300 and/or virtual-reality system 1400 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1300 and/or virtual-reality system 1400 may include microLED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
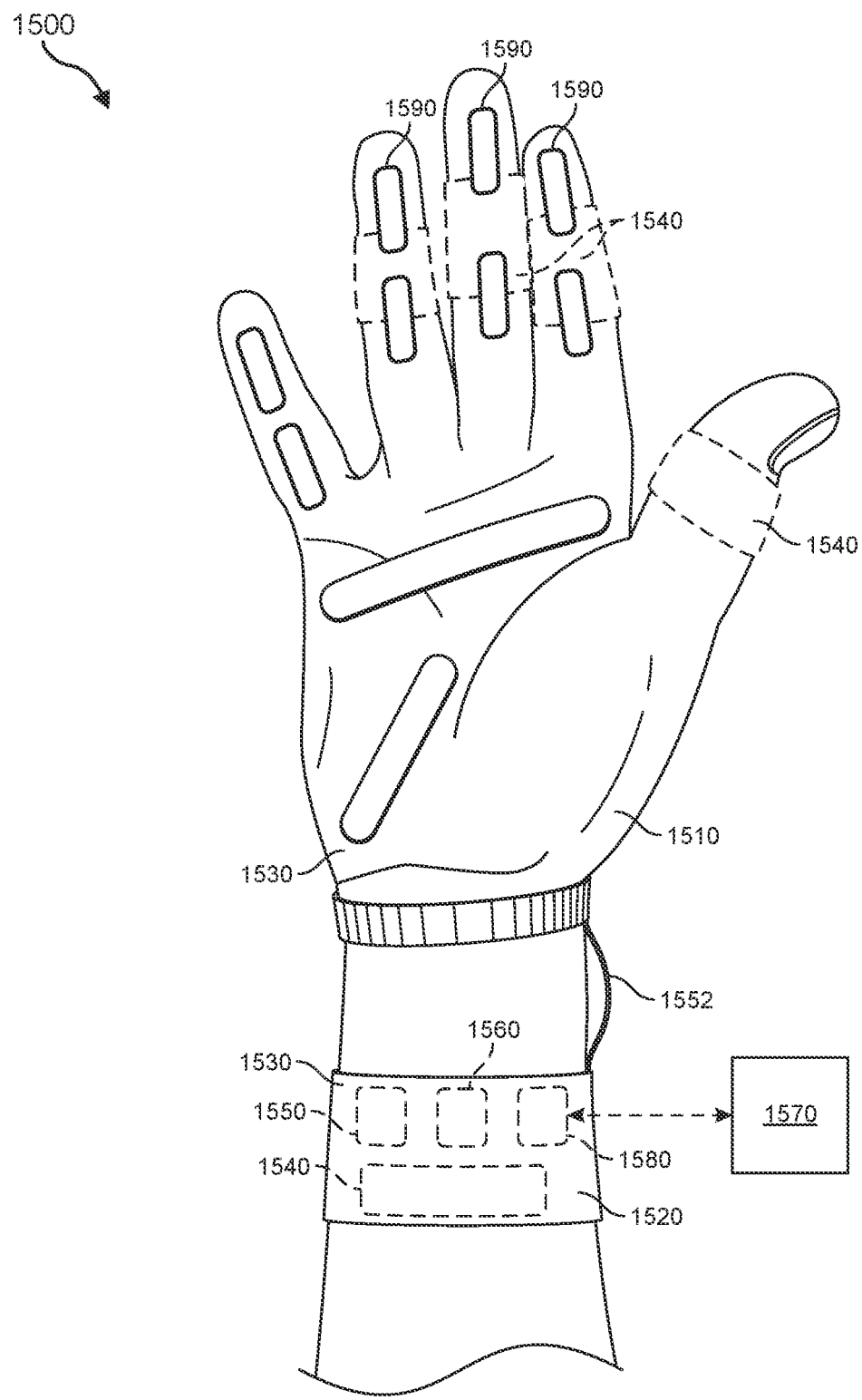
FIG. 15 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). Haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1540 may be positioned at least partially within one or more corresponding pockets formed in textile material 1530 of vibrotactile system 1500. Vibrotactile devices 1540 may be positioned in locations to provide a vibrating sensation (e.g., haptic feedback) to a user of vibrotactile system 1500. For example, vibrotactile devices 1540 may be positioned against the user's finger(s), thumb, or wrist, as shown in FIG. 15. Vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to vibrotactile devices 1540, such as via conductive wiring 1552. In some examples, each of vibrotactile devices 1540 may be independently electrically coupled to power source 1550 for individual activation. In some embodiments, a processor 1560 may be operatively coupled to power source 1550 and configured (e.g., programmed) to control activation of vibrotactile devices 1540.

Vibrotactile system 1500 may be implemented in a variety of ways. In some examples, vibrotactile system 1500 may be a standalone system with integral subsystems and components for operation independent of other devices and systems. As another example, vibrotactile system 1500 may be configured for interaction with another device or system 1570. For example, vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1580 may enable communications between vibrotactile system 1500 and the other device or system 1570 via a wireless (e.g., Wi-Fi, BLUETOOTH, cellular, radio, etc.) link or a wired link. If present, communications interface 1580 may be in communication with processor 1560, such as to provide a signal to processor 1560 to activate or deactivate one or more of the vibrotactile devices 1540.

Vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although power source 1550, processor 1560, and communications interface 1580 are illustrated in FIG. 15 as being positioned in haptic device 1520, the present disclosure is not so limited. For example, one or more of power source 1550, processor 1560, or communications interface 1580 may be positioned within haptic device 1510 or within another wearable textile.

Figure 16:
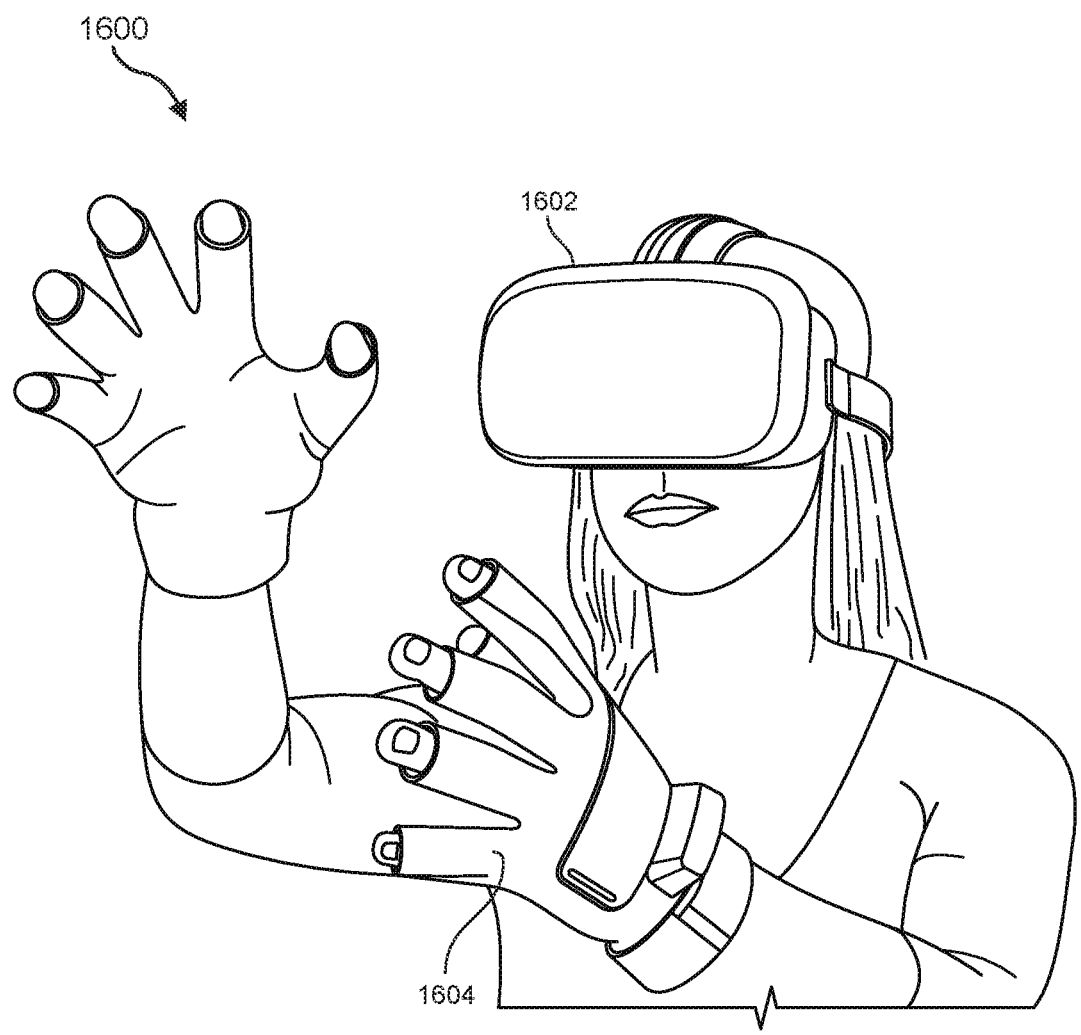
FIG. 16 is an illustration of an exemplary virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
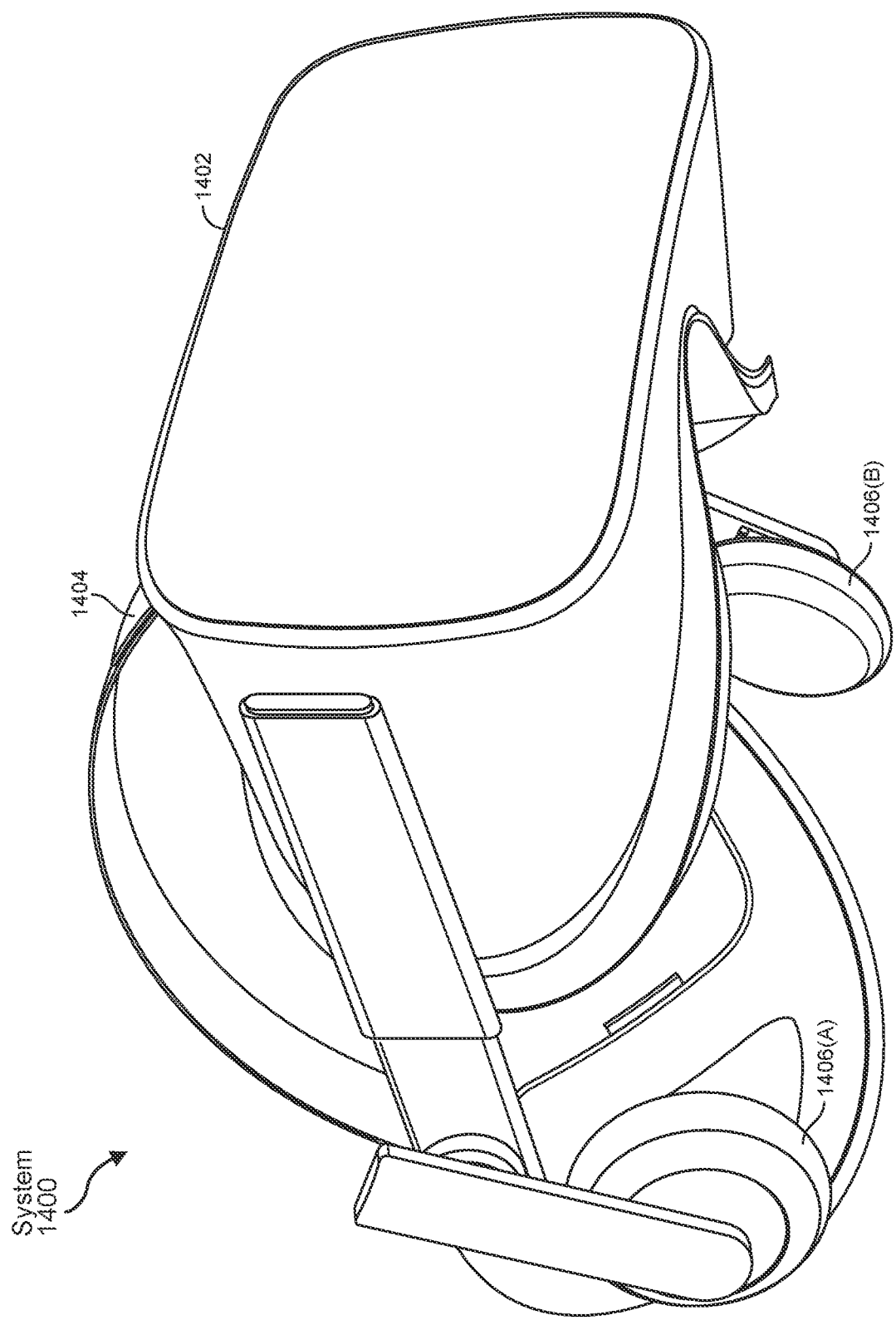
FIG. 14 is an illustration of an exemplary virtual-reality headset that may be used in connection with embodiments of this disclosure.

Head-mounted display 1602 generally represents any type or form of virtual-reality system, such as virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, haptic device 1604 may provide haptic feedback by applying vibration, motion, and/or force to the user. For example, haptic device 1604 may limit or augment a user's movement. To give a specific example, haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 1604 to send action requests to a console. Examples of action requests include, without limitation, requests to start an application and/or end the application and/or requests to perform a particular action within the application.

Figure 17:
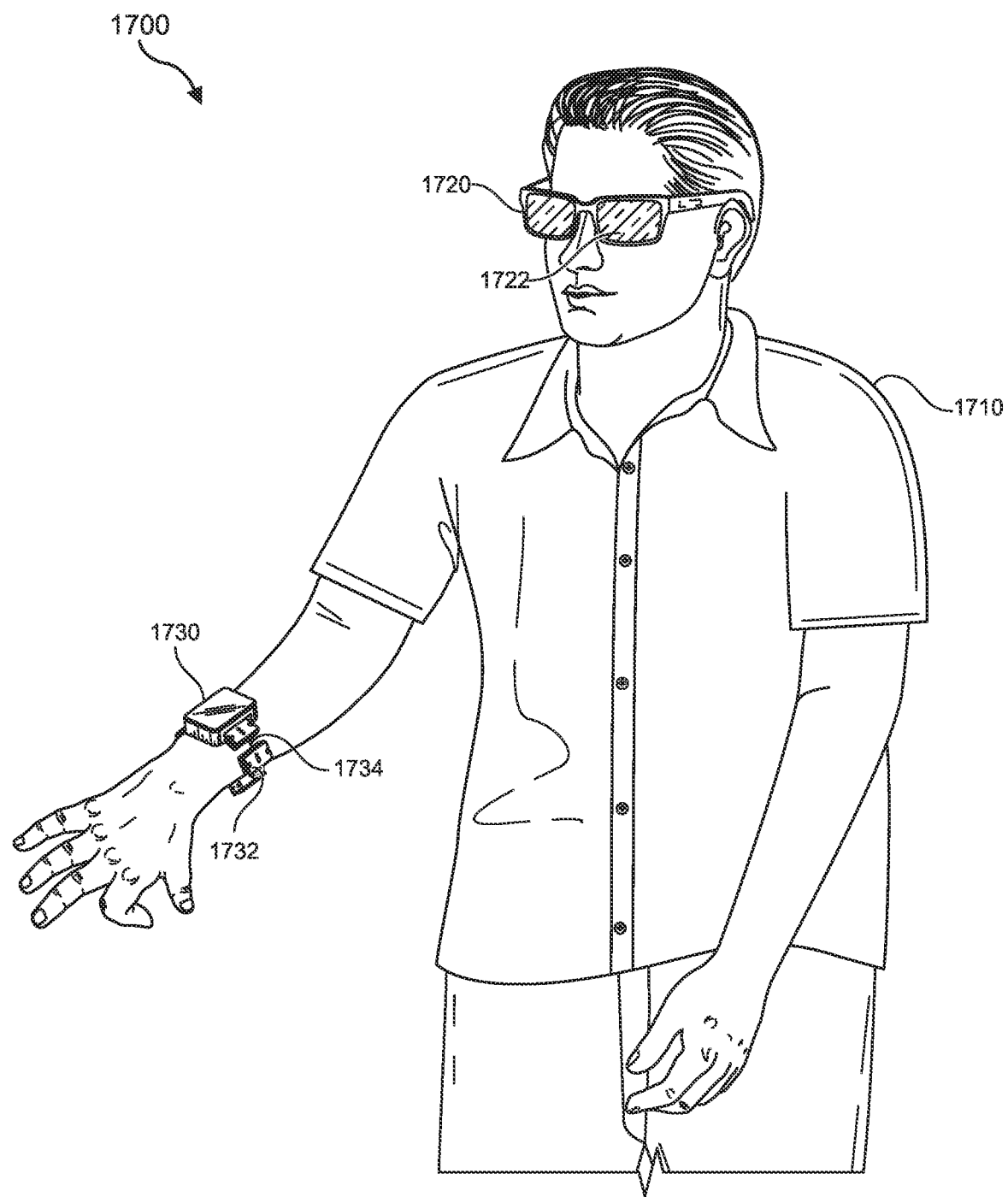
FIG. 17 is an illustration of an exemplary augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, user 1710 may wear a pair of augmented-reality glasses 1720 that may have one or more displays 1722 and that are paired with a haptic device 1730. In this example, haptic device 1730 may be a wristband that includes a plurality of band elements 1732 and a tensioning mechanism 1734 that connects band elements 1732 to one another.

One or more of band elements 1732 may include any type or form of actuator suitable for providing haptic feedback. For example, one or more of band elements 1732 may be configured to provide one or more of various types of cutaneous feedback, including vibration, force, traction, texture, and/or temperature. To provide such feedback, band elements 1732 may include one or more of various types of actuators. In one example, each of band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1510, 1520, 1604, and 1730 may include any suitable number and/or type of haptic transducer, sensor, and/or feedback mechanism. For example, haptic devices 1510, 1520, 1604, and 1730 may include one or more mechanical transducers, piezoelectric transducers, and/or fluidic transducers. Haptic devices 1510, 1520, 1604, and 1730 may also include various combinations of different types and forms of transducers that work together or independently to enhance a user's artificial-reality experience. In one example, each of band elements 1732 of haptic device 1730 may include a vibrotactor (e.g., a vibrotactile actuator) configured to vibrate in unison or independently to provide one or more of various types of haptic sensations to a user.

Figure 18A:
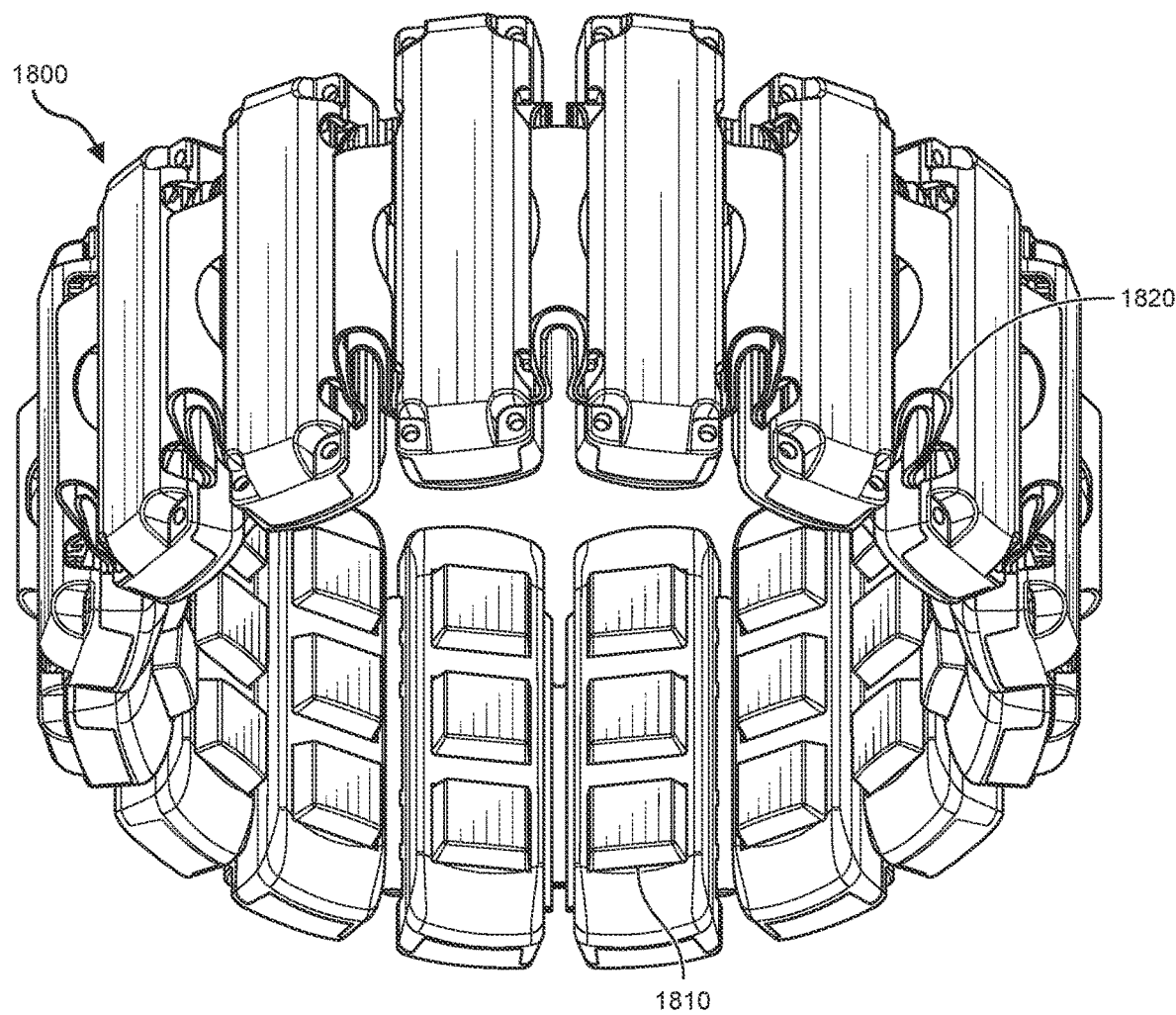
FIGS. 18A and 18B are illustrations of an exemplary human-machine interface configured to be worn around a user's lower arm or wrist.
Figure 18B:
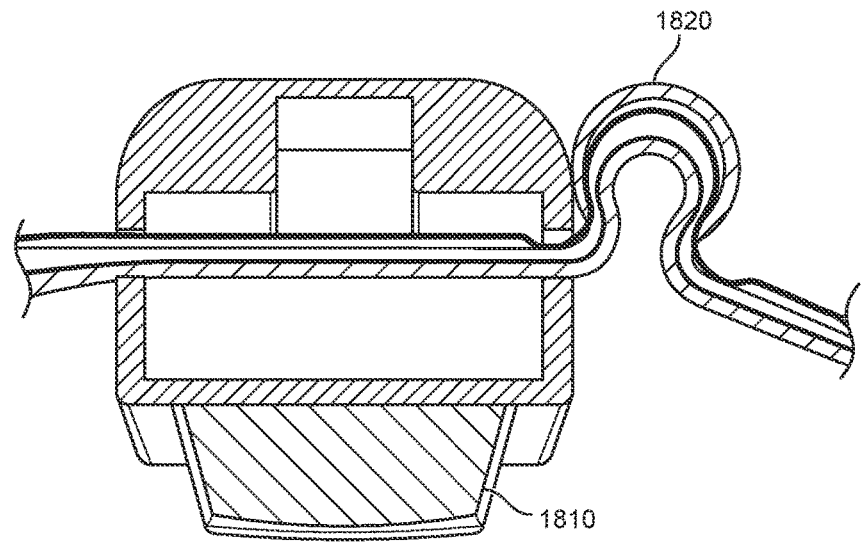

FIG. 18A illustrates an exemplary human-machine interface (also referred to herein as an EMG control interface) configured to be worn around a user's lower arm or wrist as a wearable system 1800. In this example, wearable system 1800 may include sixteen neuromuscular sensors 1810 (e.g., EMG sensors) arranged circumferentially around an elastic band 1820 with an interior surface configured to contact a user's skin. However, any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device. FIG. 18B illustrates a cross-sectional view through one of the sensors of the wearable device shown in FIG. 18A. In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 1810 is discussed in more detail below with reference to FIGS. 19A and 19B.

FIGS. 19A and 19B illustrate an exemplary schematic diagram with internal components of a wearable system with EMG sensors. As shown, the wearable system may include a wearable portion 1910 (FIG. 19A) and a dongle portion 1920 (FIG. 19B) in communication with the wearable portion 1910 (e.g., via BLUETOOTH or another suitable wireless communication technology). As shown in FIG. 19A, the wearable portion 1910 may include skin contact electrodes 1911, examples of which are described in connection with FIGS. 18A and 18B. The output of the skin contact electrodes 1911 may be provided to analog front end 1930, which may be configured to perform analog processing (e.g., amplification, noise reduction, filtering, etc.) on the recorded signals. The processed analog signals may then be provided to analog-to-digital converter 1932, which may convert the analog signals to digital signals that can be processed by one or more computer processors. An example of a computer processor that may be used in accordance with some embodiments is microcontroller (MCU) 1934, illustrated in FIG. 19A. As shown, MCU 1934 may also include inputs from other sensors (e.g., IMU sensor 1940), and power and battery module 1942. The output of the processing performed by MCU 1934 may be provided to antenna 1950 for transmission to dongle portion 1920 shown in FIG. 19B.

Dongle portion 1920 may include antenna 1952, which may be configured to communicate with antenna 1950 included as part of wearable portion 1910. Communication between antennas 1950 and 1952 may occur using any suitable wireless technology and protocol, non-limiting examples of which include radiofrequency signaling and BLUETOOTH. As shown, the signals received by antenna 1952 of dongle portion 1920 may be provided to a host computer for further processing, display, and/or for effecting control of a particular physical or virtual object or objects.

Although the examples provided with reference to FIGS. 18A-18B and FIGS. 19A-19B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference can also be implemented in wearable interfaces that communicate with computer hosts through wires and cables (e.g., USB cables, optical fiber cables, etc.).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a support structure configured to structurally support one or more system components;
a camera housing, affixed to the support structure, that houses one or more optical components for a camera;
an antenna is disposed on the camera housing; and
an antenna feed that electrically connects the antenna to a receiver or a transmitter, wherein:
the antenna is electrically connected to a flexible connector,
the flexible connector is grounded to a second flexible connector,
the antenna is electrically connected to the flexible connector,
the flexible connector is grounded to the second flexible connector and to one or more grounding pins, and
the grounding pins are grounded to one or more metal hinges.

2. The system of claim 1, wherein the antenna includes one or more conductive traces that are applied onto an outer surface of the camera housing.

3. The system of claim 2, wherein the outer surface of the camera housing is prepared for plating using laser direct structuring (LDS).

4. The system of claim 2, wherein LDS is implemented to print an antenna pattern for the antenna on at least a portion of the camera housing.

5. The system of claim 2, wherein the one or more conductive traces are applied to a camera barrel portion of the camera housing.

6. The system of claim 5, wherein the antenna is grounded to at least a portion of the camera barrel using a conductive material.

7. The system of claim 1, further comprising a spring clip that is configured to connect the antenna to a flexible connector.

8. The system of claim 7, wherein the flexible connector connects the antenna to electronic circuitry disposed on a printed circuit board.

9. The system of claim 8, wherein the flexible connector comprises a same flexible connector used to transfer camera image data to the electronic circuitry disposed on the printed circuit board.

10. The system of claim 1, further comprising a grounding arm configured to ground the antenna.

11. A wearable device comprising:
a support structure configured to structurally support one or more system components;
a camera housing, affixed to the support structure, that houses one or more optical components for a camera;
an antenna, at least a portion of which is disposed on the camera housing; and
an antenna feed that electrically connects the antenna to a receiver or a transmitter, wherein:
the antenna is electrically connected to a flexible connector,
the flexible connector is grounded to a second flexible connector,
the antenna is electrically connected to the flexible connector,
the flexible connector is grounded to the second flexible connector and to one or more grounding pins, and
the grounding pins are grounded to one or more metal hinges.

12. The wearable device of claim 11, further comprising a processor configured to process radio signals received by the receiver and process radio signals that are to be transmitted by the transmitter.

13. The wearable device of claim 11, wherein the wearable device comprises a pair of artificial reality glasses.

14. The wearable device of claim 13, wherein the artificial reality glasses include a browline portion, and wherein at least a portion of the antenna is at least partially disposed over the browline portion.

15. The wearable device of claim 11, further comprising:
a second camera housing, affixed to the support structure, that houses one or more optical components for a second camera; and
a second antenna, at least a portion of which is disposed on the second camera housing.

16. The wearable device of claim 15, wherein the antenna and the second antenna are implemented in a multiple input multiple output (MIMO) manner to increase data transfer through the receiver or through the transmitter.

17. A method of manufacturing comprising:
providing a support structure configured to structurally support one or more system components;
assembling a camera housing to the support structure, the camera housing being configured to house one or more optical components for the camera;
providing an antenna, at least a portion of which is disposed on the camera housing; and
providing an antenna feed that electrically connects the antenna to a receiver or a transmitter, wherein:
the antenna is electrically connected to a flexible connector,
the flexible connector is grounded to a second flexible connector,
the antenna is electrically connected to the flexible connector,
the flexible connector is grounded to the second flexible connector and to one or more grounding pins, and
the grounding pins are grounded to one or more metal hinges.

* * * * *